(12) United States Patent
Okada

(10) Patent No.: US 7,114,151 B2
(45) Date of Patent: Sep. 26, 2006

(54) CODE CONVERSION METHOD AND APPARATUS

(75) Inventor: Tetsuya Okada, Tokyo (JP)

(73) Assignee: Sony Corporation, Tokyo (JP)

(*) Notice: Subject to any disclaimer, the term of this patent is extended or adjusted under 35 U.S.C. 154(b) by 700 days.

(21) Appl. No.: 10/455,972

(22) Filed: Jun. 5, 2003

(65) Prior Publication Data

US 2004/0034845 A1 Feb. 19, 2004

(30) Foreign Application Priority Data

Jun. 7, 2002 (JP) ............................. 2002-167446

(51) Int. Cl.
*G06F 9/45* (2006.01)
(52) U.S. Cl. ..................... 717/161; 717/159; 717/160
(58) Field of Classification Search ......... 717/159–161
See application file for complete search history.

(56) References Cited

U.S. PATENT DOCUMENTS 4,965,724 A * 10/1990 Utsumi et al. .............. 717/160

OTHER PUBLICATIONS

Mark Scott Johnson "Effectiveness of a Machine-Level, Global Optimizer", ACM 1986, pp. 99-108.*
Hennessy et al. "Postpass Code Optimization of Pipeline Constraints", ACM Transactions on Programming Languages and Systems, vol. 5, No. 3, Jul. 1983, pp. 422-448.*
M. Anton Ertl and Andreas Krall: "Removing Anti Dependences by Repairing" Proceedings of the Compiler Construction (CC'96), 'Online! 1996, pp. 33-43, XP002255044 Retrieved from the Internet: <URL:http://citeseer.nj.nec.com/ertl96removing.html> 'retrieved on Sep. 19, 2003! * p. 34, line 17-p. 35, line 13 *.
Philip B. Gibbons, Steven S. Muchnick: "Efficient instruction scheduling for a pipelined architecture" Proceedings of the 1986 SIGPLAN Symposium on Compiler Construction, 'Online! 1996, pp. 11-16, XP002255045 ISBN: 0-89791-197-0 Retrieved from the Internet: <URL:http://portal.acm.org/citation.cfm?id=13312 &jmp=cit&dl=ACM&dl=ACM> 'retrieved on Sep. 19, 2003! * p. 11, right-hand column, line 26-line 29 * * p. 12, right-hand column, line 5-p. 14, left-hand column, line 17: figures 1, 3 *.
David Lanskov, Scott Davidson, Bruce Shriver: "Local Microcode Compaction Techniques" ACM Computing Surveys (CSUR), 'Online! Sep. 1980, pp. 261-294, XP002255046, Retrieved from the Internet: <URL:http://portal.acm.org/citation.cfm?id=356819. 356822&dl=GUIDE&dl=ACM&idx=J204&part=periodical &WantType=periodical &title=ACM%20Computing%20Surveys%20%28CSUR%29> 'retrieved on Sep. 19, 2003! * p. 261, right-hand column, line 12-p. 266, right-hand column, line 32 *.
Allan V H et al: "Enhanced Region Scheduling On A Program Dependence Graph" Microarchitecture, 1992. Micro 25., Proceedings of the 25th Annual International Symposium on Portland, OR, USA Dec. 1-4, 1992, Los Alamitos, CA, USA, IEEE Comput. Soc, US, Dec. 1, 1992, pp. 72-80, XP010094790 ISBN: 0-8186-3175-9 * p. 73, left-hand column, line 15-p. 77, right-hand column, line 41 *.
Lam M S: "Complier Optimizations for Superscalar Computers" Computing Methods in Applied Sciences and Engineering, London, GB, Jan. 29, 1990, pp. 360-377, XP000351408 * p. 362, line 6-p. 373, line 16 *.

* cited by examiner

*Primary Examiner*—Kakali Chaki
*Assistant Examiner*—William H. Wood
(74) *Attorney, Agent, or Firm*—Frommer Lawrence & Haug LLP; William S. Frommer

(57) ABSTRACT

Interlocked floating-point instructions are detected, and a register address referring to and assigning an operand in the interlocked instructions is changed to an odd-number address not assigned as any operation at the time of compiling. Next, an instruction not in any register-dependency relation with the interlocked instructions is detected, and the detected instruction is inserted between instructions interlocked with each other. Thus a program can be executed with an improved efficiency.

6 Claims, 32 Drawing Sheets

LD.D  FR0,MEM[0]          • • •   S51-1

CALL SIN                  • • •   S51-2

ST.D  FR2,MEM[2]          • • •   S51-3

FIG.2

LD.S  FR4,MEM[0]         • • •    S53-1

LD.S  FR6,MEM[1]         • • •    S53-2

MUL.S FR0,FR4,FR6        • • •    S53-3

CALL SIN                 • • •    S53-4

ST.D  FR2,MEM[2]         • • •    S53-5

FIG.4

IF: INSTRUCTION FETCH
RF: REGISTER FETCH
F0, F1, F2, F3: INSTRUCTION PERFORMANCE
FWB: OPERATION-RESULT STORAGE

MUL.S FR0,FR4,FR6 · · · S53-1

— DEPENDENCY BETWEEN FLOATING-POINT REGISTERS

ADD.S FR6,FR0,FR10 · · · S53-2

FIG.7

| LINE NUMBER | CHARACTER STRING IN ASSEMBLY LANGUAGE CODE | LABEL NAME | CONTENT OF INSTRUCTION | OPERATION |

FIG.11

| LABEL NAME | LABEL LINE NUMBER | BRANCH INSTRUCTION LINE NUMBER |

FIG.14

| LABEL NAME | LINE NUMBER | REPETITIVE STATEMENT FLAG | INSTRUCTION CHARACTER STRING | FLOATING-POINT FLAG | NO. OF INSTRUCTION CYCLES | REGISTER STATE (NO. OF FLOATING-POINT REGISTERS) | | |
|---|---|---|---|---|---|---|---|---|
| | | | | | | f0 | f1 | f31 |

FIG.16

| LABEL | INSTRUCTION | OPERAND | $f0 | $f1 | $f2 | $f3 | $f4 | $f5 | $f6 | $f7 | $f8 | $f9 | $f10 |
|---|---|---|---|---|---|---|---|---|---|---|---|---|---|
| $L111 | | | | | | | | | | | | | |
| | l.s | $f4,0($4) | | | | | DST | | | | | | |
| | l.s | $f8,0($8) | | | | | | | | | DST | | |
| | addu | $f18,$18,$17 | | | | | | | | | | | |
| | slt | $2,$18/$14 | | | | | | | | | | | |
| | add,s | $f16,$f4,$f8 | | | | | REF | | | | REF | | |
| | sub,s | $f18,$f4,$f8 | | | | | REF | | | | REF | | |
| | s,s | $f16,0($4) | | | | | | | | | | | |
| | l.s | $f4,0($6) | | | | | DST | | | | | | |
| | l.s | $f2,0($7) | | | DST | | | | | | | | |
| | mul,s | $f8,$f18,$f28 | | | | | | | | | DST | | |
| | sub,s | $f16,$f4,$f2 | | | REF | | REF | | | | | | |
| | add,s | $f6,$f4,$f2 | | | REF | | REF | | DST | | | | |
| | ass,s | $f2,$f18,$f16 | | | DST | | | | | | | | |
| | mul,s | $f18,$f16,$f26 | | | | | | | | | | | |
| | s,s | $f6,0($6) | | | | | | | REF | | | | |
| | mul,s | $f16,$f24,$f2 | | | REF | | | | | | | | |
| | sub,s | $f4,$f16,$f18 | | | | | DST | | | | | | |
| | add,s | $f18,$f8,$f16 | | | | | | | | | REF | | |
| | s,s | $f18,0($7) | | | | | | | | | | | |
| | s,s | $f4,0($8) | | | | | REF | | | | | | |
| | l.s | $f2,4($4) | | | DST | | | | | | | | |
| | l.s | $f8,0($8) | | | | | | | | | DST | | |
| | #nop | | | | | | | | | | | | |
| | add,s | $f16,$f2,$f8 | | | REF | | | | | | REF | | |
| | sub,s | $f18,$f2,$f8 | | | REF | | | | | | REF | | |
| | s,s | $f16,4($4) | | | | | | | | | | | |
| | l.s | $f6,4($6) | | | | | | | | | | | |
| | l.s | $f4,4($7) | | | | | | | | | | | |
| | mul,s | $f8,$f18,$f14 | | | | | | | | | DST | | |

FIG.18

| LABEL | INSTRUCTION | OPERAND | $f11 | $f12 | $f13 | $f14 | $f15 | $f16 | $f17 | $f18 | $f19 | $f20 | $f21 |
|---|---|---|---|---|---|---|---|---|---|---|---|---|---|
| $L111 | | | | | | | | | | | | | |
| | l.s | $f4,0($4) | | | | | | | | | | | |
| | l.s | $f8,0($8) | | | | | | | | | | | |
| | addu | $f18,$18,$17 | | | | | | | | | | | |
| | slt | $2,$18/$14 | | | | | | | | | | | |
| | add.s | $f16$f4,$f8 | | | | | | DST | | | | | |
| | sub.s | $f18,$f4,$f8 | | | | | | | | DST | | | |
| | s.s | $f16,0($4) | | | | | | REF | | | | | |
| | l.s | $f4,0($6) | | | | | | | | | | | |
| | l.s | $f2,0($7) | | | | | | | | | | | |
| | mul.s | $f8,$f18,$f28 | | | | | | | | REF | | | |
| | sub.s | $f16,$f4$f2 | | | | | | DST | | | | | |
| | add.s | $f6,$f4,$f2 | | | | | | | | | | | |
| | ass.s | $f2,$f18,$f16 | | | | | | REF | | REF | | | |
| | mul.s | $f18,$f16,$f26 | | | | | | REF | | DST | | | |
| | s.s | $f6,0($6) | | | | | | | | | | | |
| | mul.s | $f16,$f24,$f2 | | | | | | DST | | | | | |
| | sub.s | $f4,$f16,$f18 | | | | | | REF | | REF | | | |
| | add.s | $f18,$f8,$f16 | | | | | | REF | | DST | | | |
| | s.s | $f18,0($7) | | | | | | | | REF | | | |
| | s.s | $f4,0($8) | | | | | | | | | | | |
| | l.s | $f2,4($4) | | | | | | | | | | | |
| | l.s | $f8,0($8) | | | | | | | | | | | |
| | #nop | | | | | | | | | | | | |
| | add.s | $f16,$f2,$f8 | | | | | | DST | | | | | |
| | sub.s | $f18,$f2,$f8 | | | | | | | | DST | | | |
| | s.s | $f16,4($4) | | | | | | REF | | | | | |
| | l.s | $f6,4($6) | | | | | | | | | | | |
| | l.s | $f4,4($7) | | | | | | | | | | | |
| | mul.s | $f8,$f18,$f14 | | | | REF | | | | REF | | | |

FIG.19

| LABEL | INSTRUCTION | OPERAND | $f22 | $f23 | $f24 | $f25 | $f26 | $f27 | $f28 | $f29 | $f30 | $f31 |
|---|---|---|---|---|---|---|---|---|---|---|---|---|
| $L111 | | | | | | | | | | | | |
| | l.s | $f4,0($4) | | | | | | | | | | |
| | l.s | $f8,0($8) | | | | | | | | | | |
| | addu | $f18,$18,$17 | | | | | | | | | | |
| | slt | $2,$18/$14 | | | | | | | | | | |
| | add,s | $f16$f4,$f8 | | | | | | | | | | |
| | sub,s | $f18,$f4,$f8 | | | | | | | | | | |
| | s,s | $f16,0($4) | | | | | | | | | | |
| | l.s | $f4,0($6) | | | | | | | | | | |
| | l.s | $f2,0($7) | | | | | | | | | | |
| | mul,s | $f8,$f18,$f28 | | | | | | | REF | | | |
| | sub,s | $f16,$f4$f2 | | | | | | | | | | |
| | add,s | $f6,$f4,$f2 | | | | | | | | | | |
| | ass,s | $f2,$f18,$f16 | | | | | | | | | | |
| | mul,s | $f18,$f16,$f26 | | | | | | REF | | | | |
| | s,s | $f6,0($6) | | | | | | | | | | |
| | mul,s | $f16,$f24,$f2 | | | | REF | | | | | | |
| | sub,s | $f4,$f16,$f18 | | | | | | | | | | |
| | add,s | $f18,$f8,$f16 | | | | | | | | | | |
| | s,s | $f18,0($7) | | | | | | | | | | |
| | s,s | $f4,0($8) | | | | | | | | | | |
| | l.s | $f2,4($4) | | | | | | | | | | |
| | l.s | $f8,0($8) | | | | | | | | | | |
| | #nop | | | | | | | | | | | |
| | add,s | $f16,$f2,$f8 | | | | | | | | | | |
| | sub,s | $f18,$f2,$f8 | | | | | | | | | | |
| | s,s | $f16,4($4) | | | | | | | | | | |
| | l.s | $f6,4($6) | | | | | | | | | | |
| | l.s | $f4,4($7) | | | | | | | | | | |
| | mul,s | $f8,$f18,$f14 | | | | | | | | | | |

FIG.20

| LABEL | INSTRUCTION | OPERAND | $f0 | $f1 | $f2 | $f3 | $f4 | $f5 | $f6 | $f7 | $f8 | $f9 | $f10 |
|---|---|---|---|---|---|---|---|---|---|---|---|---|---|
| $L111 | | | | | | | | | | | | | |
| | l.s | $f4,0($4) | | | | | DST | | | | | | |
| | l.s | $f8,0($8) | | | | | | | | | DST | | |
| | addu | $f18,$18,$17 | | | | | | | | | | | |
| | slt | $2,$18/$14 | | | | | | | | | | | |
| | add.s | $f16,$f4,$f8 | | | | | REF | | | | REF | | |
| | sub.s | $f18,$f4,$f8 | | | | | REF | | | | REF | | |
| | s.s | $f16,0($4) | | | | | | | | | | | |
| | l.s | $f4,0($6) | | | | | DST | | | | | | |
| | l.s | $f2,0($7) | | | DST | | | | | | | | |
| | mul.s | $f8,$f18,$f28 | | | | | | | | | DST | | |
| | sub.s | $f16,$f4,$f2 | | | REF | | REF | | | | | | |
| | add.s | $f6,$f4,$f2 | | | REF | | REF | | DST | | | | |
| | ass.s | $f2,$f18,$f16 | | | DST | | | | | | | | |
| | mul.s | $f18,$f16,$f28 | | | | | | | | | | | |
| | s.s | $f6,0($6) | | | | | | | REF | | | | |
| | mul.s | $f16,$f24,$f2 | | | REF | | | | | | | | |
| | sub.s | $f4,$f16,$f18 | | | | | DST | | | | | | |
| | add.s | $f18,$f8,$f16 | | | | | | | | | REF | | |
| | s.s | $f18,0($7) | | | | | | | | | | | |
| | s.s | $f4,0($8) | | | | | REF | | | | | | |
| | l.s | $f2,4($4) | | | DST | | | | | | | | |
| | l.s | $f8,0($8) | | | | | | | | | DST | | |
| | #nop | | | | | | | | | | | | |
| | add.s | $f16,$f2,$f8 | | | REF | | | | | | REF | | |
| | sub.s | $f18,$f2,$f8 | | | REF | | | | | | REF | | |
| | s.s | $f16,4($4) | | | | | | | | | | | |
| | l.s | $f6,4($6) | | | | | | | DST | | | | |
| | l.s | $f4,4($7) | | | | | DST | | | | | | |
| | mul.s | $f8,$f18,$f14 | | | | | | | | | DST | | |

FIG.22

| LABEL | INSTRUCTION | OPERAND | $f11 | $f12 | $f13 | $f14 | $f15 | $f16 | $f17 | $f18 | $f19 | $f20 | $f21 |
|---|---|---|---|---|---|---|---|---|---|---|---|---|---|
| $L111 | | | | | | | | | | | | | |
| | l.s | $f4,0($4) | | | | | | | | | | | |
| | l.s | $f8,0($8) | | | | | | | | | | | |
| | addu | $f18,$18,$17 | | | | | | | | | | | |
| | slt | $2,$18/$14 | | | | | | | | | | | |
| | add,s | $f16$f4,$f8 | | | | | | DST | | | | | |
| | sub,s | $f18,$f4,$f8 | | | | | | | | DST | | | |
| | s,s | $f16,0($4) | | | | | | REF | | | | | |
| | l.s | $f4,0($6) | | | | | | | | | | | |
| | l.s | $f2,0($7) | | | | | | | | | | | |
| | mul,s | $f8,$f18,$f28 | | | | | | | | REF | | | |
| | sub,s | $f16,$f4$f2 | | | | | | DST | | | | | |
| | add,s | $f6,$f4,$f2 | | | | | | | | | | | |
| | ass,s | $f2,$f18,$f16 | | | | | | REF | | REF | | | |
| | mul,s | $f18,$f16,$f26 | | | | | | REF | | DST | | | |
| | s,s | $f6,0($6) | | | | | | | | | | | |
| | mul,s | $f16,$f24,$f2 | | | | | | DST | | | | | |
| | sub,s | $f4,$f16,$f18 | | | | | | REF | | REF | | | |
| | add,s | $f18,$f8,$f16 | | | | | | REF | | DST | | | |
| | s,s | $f18,0($7) | | | | | | | | REF | | | |
| | s,s | $f4,0($B) | | | | | | | | | | | |
| | l.s | $f2,4($4) | | | | | | | | | | | |
| | l.s | $f8,0($8) | | | | | | | | | | | |
| | #nop | | | | | | | | | | | | |
| | add,s | $f16,$f2,$f8 | | | | | | DST | | | | | |
| | sub,s | $f18,$f2,$f8 | | | | | | | | DST | | | |
| | s,s | $f16,4($4) | | | | | | REF | | | | | |
| | l.s | $f6,4($6) | | | | | | | | | | | |
| | l.s | $f4,4($7) | | | | | | | | | | | |
| | mul,s | $f8,$f18,$f14 | | | | REF | | | | REF | | | |

FIG.23

| LABEL | INSTRUCTION | OPERAND | $f22 | $f23 | $f24 | $f25 | $f26 | $f27 | $f28 | $f29 | $f30 | $f31 |
|---|---|---|---|---|---|---|---|---|---|---|---|---|
| $L111 | | | | | | | | | | | | |
| | l.s | $f4,0($4) | | | | | | | | | | |
| | l.s | $f8,0($8) | | | | | | | | | | |
| | addu | $f18,$18,$17 | | | | | | | | | | |
| | slt | $2,$18/$14 | | | | | | | | | | |
| | add,s | $f16$f4,$f8 | | | | | | | | | | |
| | sub,s | $f18,$f4,$f8 | | | | | | | | | | |
| | s,s | $f16,0($4) | | | | | | | | | | |
| | l.s | $f4,0($6) | | | | | | | | | | |
| | l.s | $f2,0($7) | | | | | | | | | | |
| | mul,s | $f8,$f18,$f28 | | | | | | | REF | | | |
| | sub,s | $f16,$f4$f2 | | | | | | | | | | |
| | add,s | $f6,$f4,$f2 | | | | | | | | | | |
| | ass,s | $f2,$f18,$f16 | | | | | | | | | | |
| | mul,s | $f18,$f16,$f26 | | | | | REF | | | | | |
| | s,s | $f6,0($6) | | | | | | | | | | |
| | mul,s | $f16,$f24,$f2 | | | REF | | | | | | | |
| | sub,s | $f4,$f16,$f18 | | | | | | | | | | |
| | add,s | $f18,$f8,$f16 | | | | | | | | | | |
| | s,s | $f18,0($7) | | | | | | | | | | |
| | s,s | $f4,0($8) | | | | | | | | | | |
| | l.s | $f2,4($4) | | | | | | | | | | |
| | l.s | $f8,0($8) | | | | | | | | | | |
| | #nop | | | | | | | | | | | |
| | add,s | $f16,$f2,$f8 | | | | | | | | | | |
| | sub,s | $f18,$f2,$f8 | | | | | | | | | | |
| | s,s | $f16,4($4) | | | | | | | | | | |
| | l.s | $f6,4($6) | | | | | | | | | | |
| | l.s | $f4,4($7) | | | | | | | | | | |
| | mul,s | $f8,$f18,$f14 | | | | | | | | | | |

FIG.24

NTH LINE        sub.s  $f1  $f22  $f14        ⎫
(N+1)TH LINE    s.s    $f1  0($f8)            ⎬ RENAMING FROM $f2 TO #f1

MTH LINE        l.s    $f3  0($f8)            ⎫
(M+1)TH LINE    sub.s  $f16 $f3  $f24         ⎬ RENAMING FROM $f28 TO $f3

FIG.27

A: CODES INTERLOCKED

| N : | l.s $f2,0($10) | |
| N+1: | l.s $f4,0($12) | ⎫ |
| N+2: | mul.s $f6,$f2,$f4 | ⎭ INTERLOCKING |
| N+3: | l.s $f8,4($10) | |
| N+4: | l.s $f10,4($12) | ⎫ |
| N+5: | mul.s $f12,$f8,$f10 | ⎭ INTERLOCKING |
| N+6: | l.s $f14,8($10) | |
| N+7: | l.s $f16,8($12) | |

⋮

B: CODED NOT INTERLOCKED

| N : | l.s $f2,0($10) | |
| N+1: | l.s $f4,0($12) | |
| N+3: | l.s $f8,4($10) | ⎫ NON-INTERLOCKING |
| N+2: | mul.s $f6,$f2,$f4 | ⎭ |
| N+4: | l.s $f10,4($12) | |
| N+6: | l.s $f14,8($10) | ⎫ NON-INTERLOCKING |
| N+5: | mul.s $f12,$f8,$f10 | ⎭ |
| N+7: | l.s $f16,8($12) | |

CODE CONVERSION METHOD AND APPARATUS

BACKGROUND OF THE INVENTION

1. Field of the Invention

The present invention relates to a code conversion method and apparatus for converting the content of an assembly language code with which a computer system can perform a given instruction.

This application s the priority of the Japanese Patent Application No. 2002-167446 filed on Jun. 7, 2002, the entirety of which is incorporated by reference herein.

2. Description of the Related Art

For getting a processor like CPU or DSP to execute a source program stated in a high-level programming language such as the C language or the like, the code of the source program has to be converted into an execute form that enables such processors to perform instructions specified by the source program.

FIG. 1 shows a flow of operations made in the conventional conversion of a source program stated in a high-level programming language into an execute form that enables a processor to perform instructions specified by the source program.

In the conventional code conversion method, a source program stated in a high-level programming language such as the C language or the like is converted by a compiler into an assembly language code that can be understood by an object processor (in step S50-1). In the assembly language code, one line states one instruction whose operand is a program code directly representing an address in a data register in the processor hardware. Next, the assembly language code is converted by an assembler into a machine language that can be understood by the object processor (in step S50-2). Next, a plurality of programs stated in the machine language is combined together and converted into a code executable by the object processor (in step S50-3).

Note that for many of the recent processors such as CPU, DSP and the like, a fixed-point instruction as an operand and a floating-point instruction as an operand are included in a set of instructions. A floating-point instruction is normally performed by a floating-point unit in the processor. The floating-point unit will perform the instructions referencing to operands stored in a floating-point register provided separately from a fixed-point register and also assign a determined floating-point value in the floating-point register.

The floating-point is defined in the IEEE 754 "Floating-point Standard". In the definition in the IEEE 754, the floating-point includes a single-precision floating-point and a double-precision one. The floating-point unit can normally make a single-precision operation in which a single-precision floating-point value is used as an operand and a double-precision operation in which a double-precision floating-point value is used as an operand. In the floating-point register, each address is set in units of a single-precision floating-point bit. Therefore, in the single-precision operation, a value stored in one floating-point register is manipulated as an operation for one word while in the double-precision operation, values stored in two floating-point registers are combined and manipulated as an operand for one word.

For the floating-point unit in a data processor, there is provided an arithmetic operation library capable of performing arithmetic operation instructions and also calculating a trigonometric function, logarithmic function etc. Generally, the double-precision operation is used when the arithmetic operation library is used.

Note here that double-precision floating-point instruction data in two registers are combined together and manipulated as one operand for one word but only the address in one of the registers is assigned as the operand. Therefore, when the compiler compiles a double-precision floating-point instruction, it will assign only the even-number register address to an operand for the double-precision floating-point instruction with the odd-number register address being always opened. By assigning the registers in this way, two register areas are assigned to an double-precision floating-point operand.

FIG. 2 shows an example of the assembly language code statement including double-precision floating-point instructions, and FIG. 3 shows the use of a floating-point register and memory when the assembly language code stated as shown in FIG. 2 is performed.

In the assembly language code shown in FIG. 2, a double-precision floating-point value stored in memories MEM[0] and MEM[1] are loaded to floating-point registers FR0 and FR1, respectively, under a double-precision load instruction LD.D (in step S51-1). Next, an arithmetic operation library for an SIN function is called under a call instruction CAL SIN in the arithmetic operation library and double-precision SIN function values calculated on the basis of the double-precision floating-point value stored in the floating-point register FR0 is stored into floating-point registers FR2 and FR3, respectively (in step S51-2). Next, the double-precision floating-point values stored in the floating-point registers FR2 and FR3 are stored into memories MEM[2] and MEM[3], respectively, under a double-precision store instruction ST.D.

By assigning only the even-number register address to the operand as above, two successive register areas can be assigned to a double-precision floating-point instruction operand.

Also, the processor normally makes reference to and assigns both the single-precision floating-point instruction operand and double-precision floating-point instruction operand with the use of the same floating-point register. On this account, the compiler has to assign only the even-number register address as an operand for no conflict for a register with the double-precision floating-point instruction when it compiles the single-precision floating-point instruction as well as it compiles the double-precision floating-point instruction.

FIG. 4 shows an example of the assembly language code statement including double- and single-precision floating-point instructions, and FIG. 5 shows the use of the a register and memory when the assembly language code stated as shown in FIG. 4 is executed.

In the assembly language code shown in FIG. 4, a single-precision floating-point value stored in the memory MEM[0] is loaded to floating-point register FR4 under a single-precision load instruction LD.S (in step S53-1). Next, a single-precision floating-point value stored in the memory MEM[1] is loaded to a floating-point register FR6 under the single-precision load instruction LD.S (in step S53-2). Then, single-precision floating-point values stored in the floating-point registers FR4 and FR6 are multiplied under a single-precision multiply instruction MUL.S and the result of multiplication is stored into the floating-point register FR0 (in step S53-3). Next, an arithmetic operation library for an SIN function is called under a call instruction CALL SIN in the arithmetic operation library and double-precision SIN function values calculated on the basis of the single-precision floating-point value stored in the floating-point register FRO is stored into floating-point registers FR2 and FR3, respectively (in step S53-4). Then, the double-precision floating-point values stored in the floating-point registers FR2 and FR3 are stored into memories MEM[2] and MEM[3], respectively, under the double-precision store instruction ST.D.

That is, when the compiler compiles the floating-point instruction, it will generate an assembly language code having an operand to which only the floating-point register at an even-number address is assigned, whether the floating-point instruction is a single-precision one or double-precision one.

However, in case only an even-number register address is assigned to an operand, for example, in the case of a program including no double-decision floating-point instructions or a program including a very small number of double-decision floating-point instructions, about a half of all the floating-point registers will not be used, that is, the floating-point registers cannot be used efficiently. If the registers are not usable efficiently, the number of the registers will possibly be insufficient for instructions. When the registers are insufficient in number, data will be saved into the memory and registers are released for other instructions, and after completion of the instructions, the saved data has to be returned to the registers, which will need more instructions than in case the registers are sufficient in number for instructions.

Also, the recent processors such as a CPU and DSP can perform operations to be done under one instruction, such as performance of an operation, storage of operation result, etc. in parallel in the hardware. Such a hardware configuration is generally called "pipeline configuration". FIG. 6 shows, for example, a data processing timing of a pipeline-configured processor (will be referred to as "pipeline processor" hereunder) which performs one instruction for operations from instruction fetch (IF) to operation result storage (FWB) with respective seven clocks. Such a pipeline processor can perform one instruction apparently with one clock.

However, even such a pipeline data processor cannot perform instructions with an improved efficiency when interlocking takes place between the instructions to be performed.

For example, an assembly language code as shown in FIG. 7 is assumed here that is structured for performing an instruction (MUL.S FR0, FR2, FR4) for multiplication of single-precision floating-point values in the floating-point registers FR2 and FR4 by each other and then for storing the multiplication result into the floating-point register FR0, and then performing an instruction (ADD. S FR6, FR0, FR10) for adding the single-precision floating-point values stored in the floating-point registers FR0 and FR10 and storing the addition result into the floating-point register FR6. Even if the data processor has executed such an assembly language code, it has to wait for performance of the next instruction (ADD.S FR6, FR0, FR10) until the result of operation under the instruction (MUL.S FR0, FR2, FR4) is written into the register as shown in FIG. 8.

That is, in case there is a register-dependency relation between a plurality of instructions, no improvement in efficiency of instruction performance can be attained in the pipeline processing unless there is provided a sufficient margin between the instructions. In the seven-step pipeline data processor as shown in FIG. 6, interlocking will take place between the instructions unless more than five instructions lie between the instructions which are in the register-dependency relation with each other.

The above interlocking will probably take place less frequently if sufficiently many registers are available. However, the floating-point registers are used with low efficiency as above. Therefore, the interlocking will take place with a high frequency.

In the assembly language code generated by the conventional compiler, since only an even-number register address is assigned as an operand in a floating-point instruction, the number of instructions increases and interlocking possibly takes place with a high frequency in the pipeline data processor. As a result, with an assembly language code generated by the conventional compiler, a program cannot be executed with a low efficiency.

OBJECT AND SUMMARY OF THE INVENTION

It is therefore an object of the present invention to overcome the above-mentioned drawbacks of the related art by providing a code conversion method and apparatus for allowing a program to be executed with an improved efficiency.

The above object can be attained by providing a code conversion method of converting a program code having an instruction operand stated therein with an assembly language code represented by a register address in a data processing system, the method including according to the present invention, an interlock detecting step of detecting an interlocked instruction among floating-point instructions included in the program code, on which the number of instructions counted until a register having the operand assigned thereto is referred to by another instruction is smaller than the number of execute cycles of the floating-point instruction; an address renaming step of changing a register address according to which an operand is referred to and assigned by the interlocked instructions to a register address not assigned as an instruction operand when the assembly language code is compiled; and a code reordering step of detecting an instruction which is not in any register-dependency relation with all the instructions between itself and the interlocked instruction among the instructions ranging from the interlocked instruction to a first label statement or branch instruction found after the interlocked instruction, and moving the detected instruction code to any position between the interlocked instructions and an instruction referring to a register in which the operand has been assigned under the interlocked instruction.

Also the above object can be attained by providing a code converter for converting the content of a program code whose instruction operand stated with an assembly language code represented by a register address in a data processing system, the method including according to the present invention, an interlock detecting means for detecting an interlocked instruction among floating-point instructions included in the program code, on which the number of instructions counted until a register having the operand assigned thereto is referred to by another instruction is smaller than the number of execute cycles of the floating-point instruction; an address renaming means for changing a register address at which the interlocked instructions refer to and assign the operand to a register address not assigned as an instruction operand when the assembly language code is compiled; and a code reordering means for detecting an instruction which is not in any register-dependency relation with all the instructions between itself and the interlocked instruction among the instructions ranging from the interlocked instruction to a first label statement or branch instruction found after the interlocked instruction, and moving the detected instruction code to any position between the interlocked instructions and an instruction referring to a register in which the operand has been assigned under the interlocked instruction.

The program code is supplied to said data processing system after compiled from its statement in a high-level programming language to an assembly language code suitable for the data processing system.

In the data processing system, said instruction includes a single-precision floating-point instruction by which one register is dealt with as a one-word operand and a double-precision floating-point instruction by which two registers are dealt with as one-word operand.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 2 shows an example of the assembly language code statement including double-precision floating-point instructions;

FIG. 4 shows an example of the assembly language code statement including double- and single-precision floating-point instructions;

FIG. 7 shows an assembly language code when the pipeline processor interlocks;

FIG. 11 shows the data structure of an intermediate code;

FIG. 14 shows the data structure of a label code;

FIG. 16 shows the data structure of a floating-point register usage code;

FIG. 18 shows an image of the floating-point register usage code (register addresses $f0 to $f10) generated as shown in FIG. 17;

FIG. 19 shows an image of the floating-point register usage code (register addresses $f11 to $f21) generated as shown in FIG. 17;

FIG. 20 shows an image of the floating-point register usage code (register addresses $f22 to $f31) generated as shown in FIG. 17;

FIG. 22 shows an image of the floating-point register usage code (register addresses $f0 to $f10) after analyzed as shown in FIG. 21;

FIG. 23 shows an image of the floating-point register usage code (register addresses $f11 to $f21) after analyzed as shown in FIG. 21;

FIG. 24 shows an image of the floating-point register usage code (register addresses $f22 to $f31) analyzed as shown in FIG. 21;

FIG. 27 shows the assembly language code after the assembly language code shown in FIG. 25 is renamed;

FIG. 31 shows the assembly language code before undergoing the code reordering and the assembly language code after undergoing the code reordering.

DETAILED DESCRIPTION OF THE PREFERRED EMBODIMENTS

In the following, there will be described a code conversion method (broadly, a compiling method) of converting a source program stated in a high-level programming language into a program code having an execute form in which a processor such as CPU, DSP or the like can run the program.

Note that it is assumed that the processor such as CPU or DSP that runs the program code in such an execute form generated by the code conversion method according to the present invention includes a floating-point unit operating under an instruction set for an operation or processing taking at least a floating-point as an operand. It is also assumed that the processor includes a plurality of floating-point registers to store an operand in an instruction the floating-point unit performs. Further, it is assumed that each of the floating-point registers has successive addresses starting with "0" (0 to 31, for example). Moreover, it is assumed that the processor includes a single-precision floating-point instruction and double-precision floating-point instruction in the instruction set.

Figure 1:
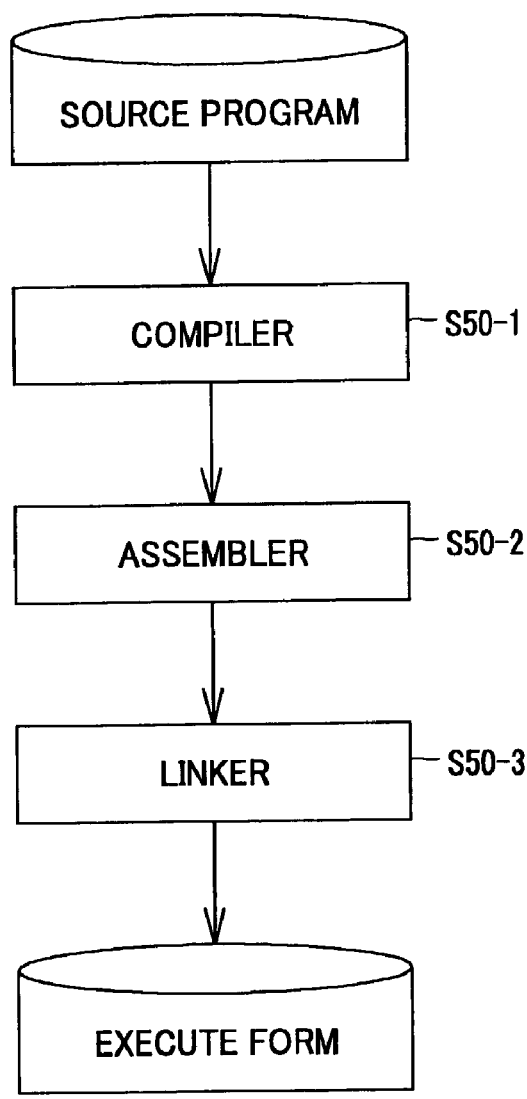
FIG. 1 shows a flow of operations made in the conventional code conversion method.
Figure 3:
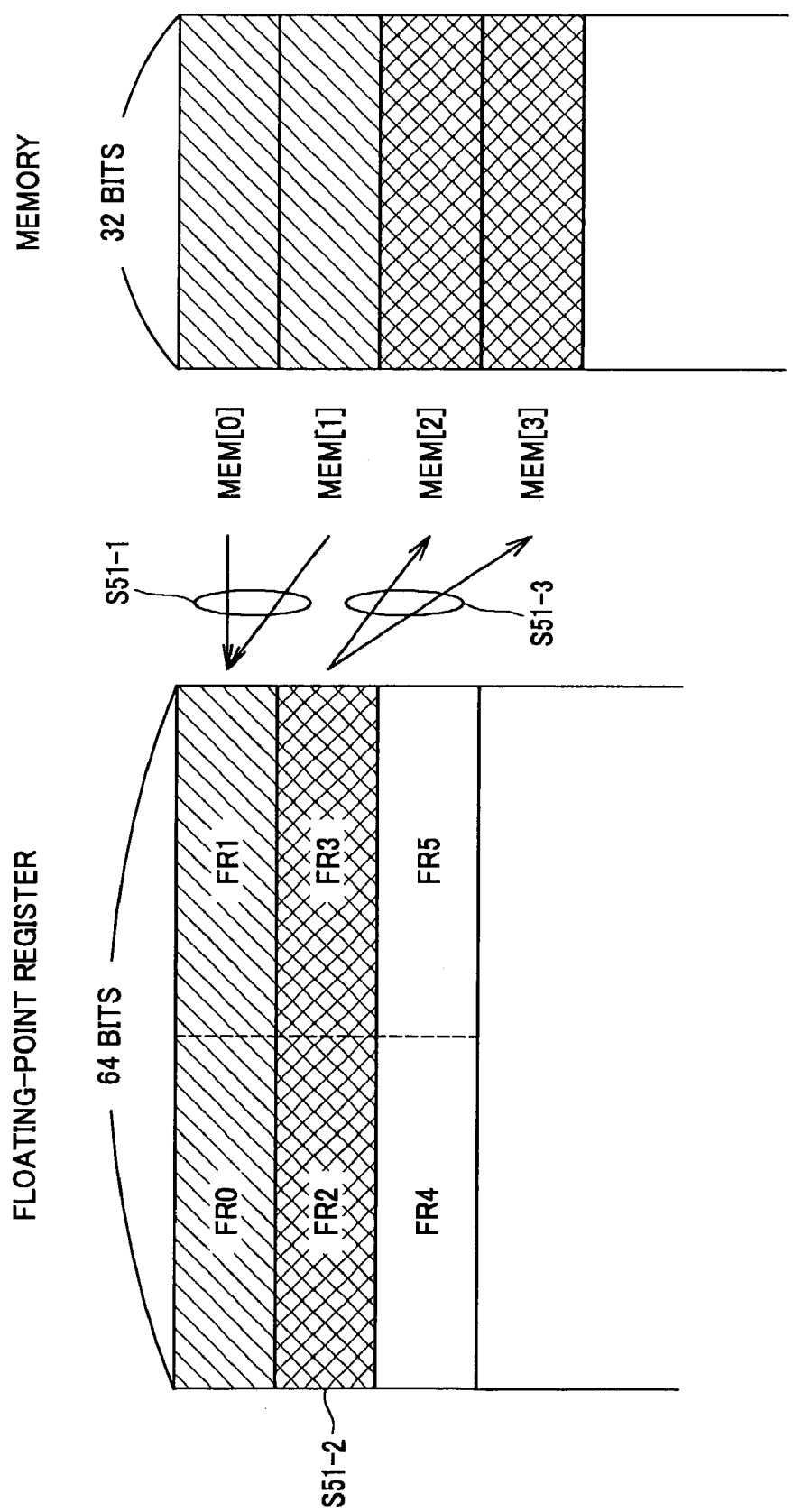
FIG. 3 shows the use of a floating-point register and memory when the assembly language code stated as shown in FIG. 2 is executed.
Figure 5:
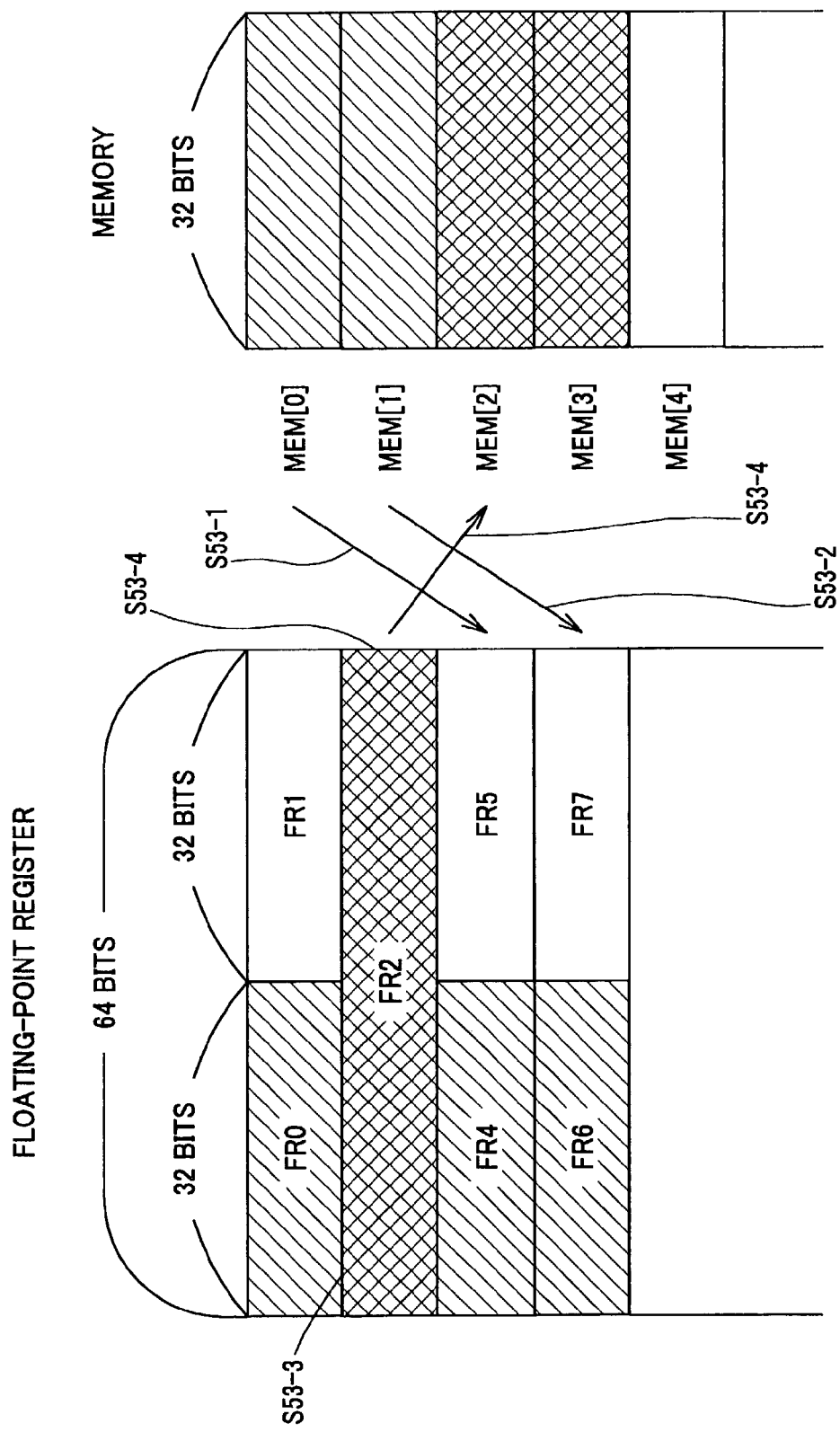
FIG. 5 shows the use of the floating-point register and memory when the assembly language code stated as shown in FIG. 4 is executed.
Figure 6:
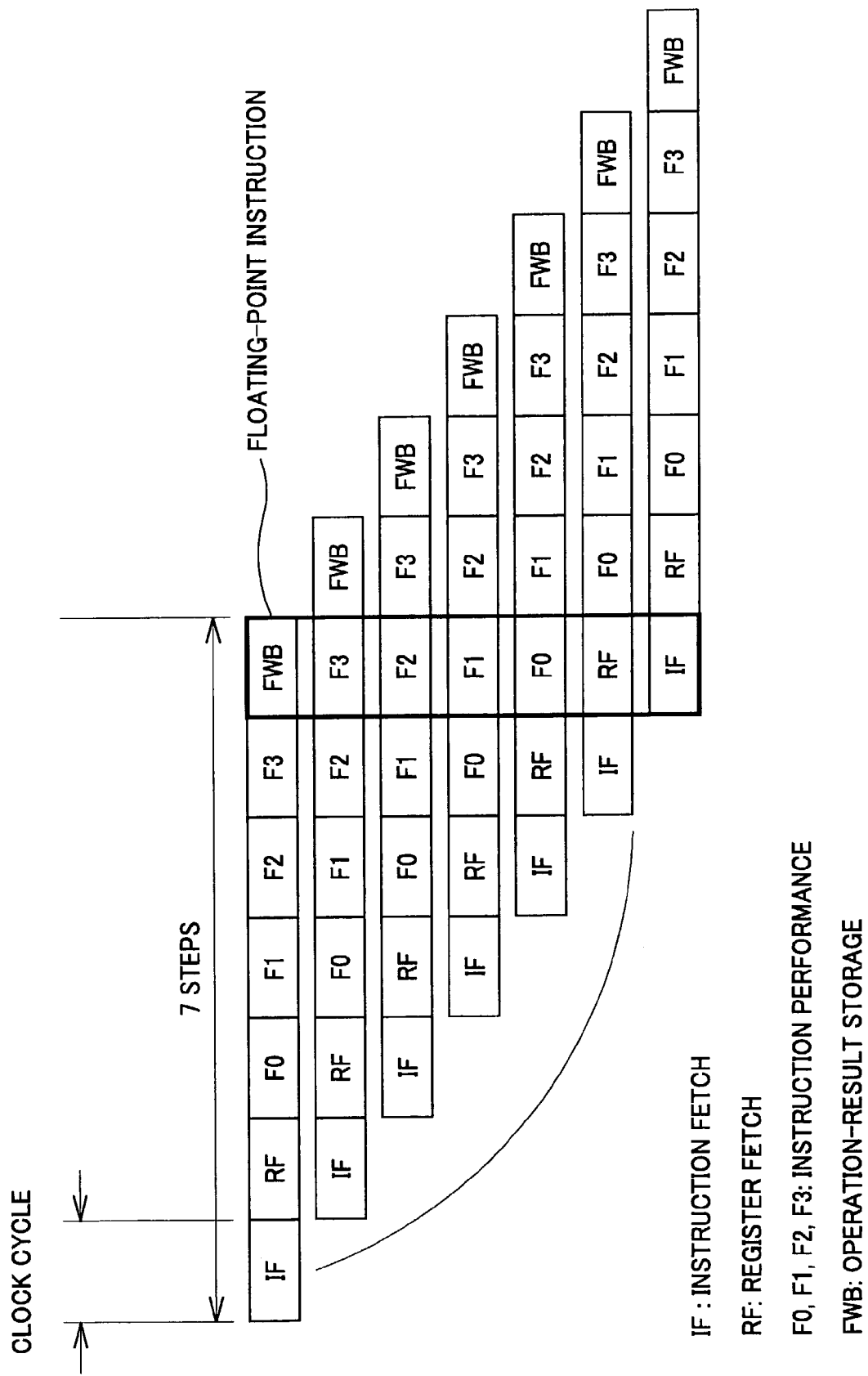
FIG. 6 explains the timing of parallel performance of instructions in a pipeline-configured data processor.
Figure 8:
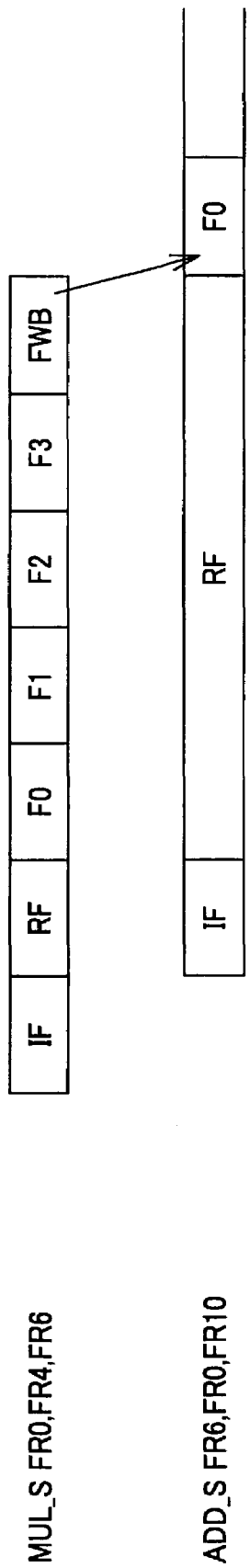
FIG. 8 explains the timing of parallel performance of instructions when the assembly language code stated as shown in FIG. 7 is executed.
Figure 9:
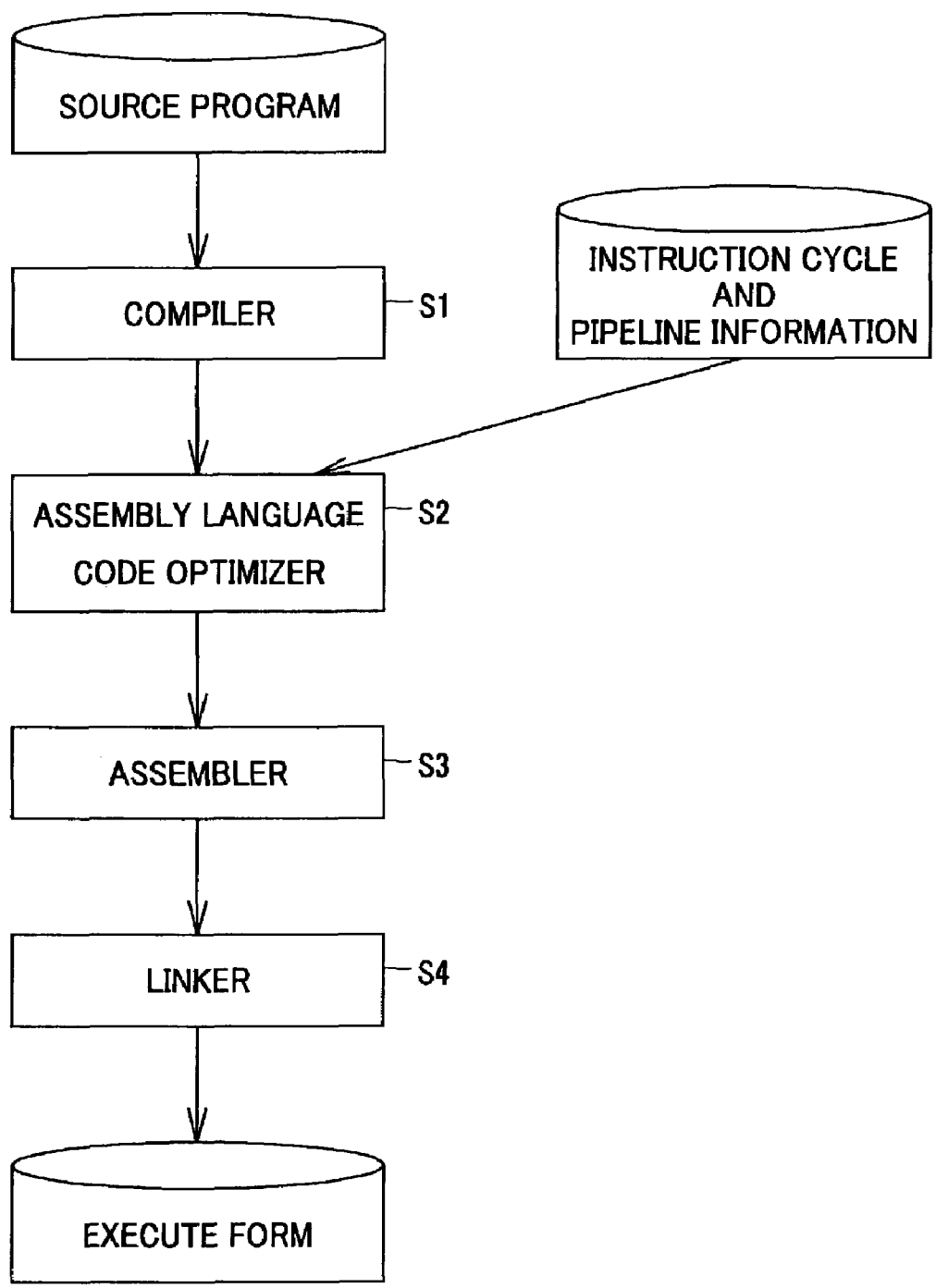
FIG. 9 shows a flow of operations made in the code conversion method according to the present invention.

FIG. 9 shows a flow of operations made in the code conversion method according to the-present invention.

In the code conversion method according to the present invention, a source program stated in a high-level programming language such as the C language is converted by a compiler into an assembly language code intended for an object processor (as in step S1). The assembly language code is a program code in which one instruction stated in one line and an operand in the instruction is represented directly by a register address in the hardware of the data processor. An assembly language code optimizer converts the assembly language code generated by the compiler into an assembly language code that can be executed with a high efficiently (as in step S2). Next, the assembly language code is converted by an assembler into a machine language intended for execution by the object data processor (as in step S3). Then, the plurality of programs stated in the machine language is combined together by a linker into a code having an execute form in which the object data processor can run the program (as in step S4).

Figure 10:
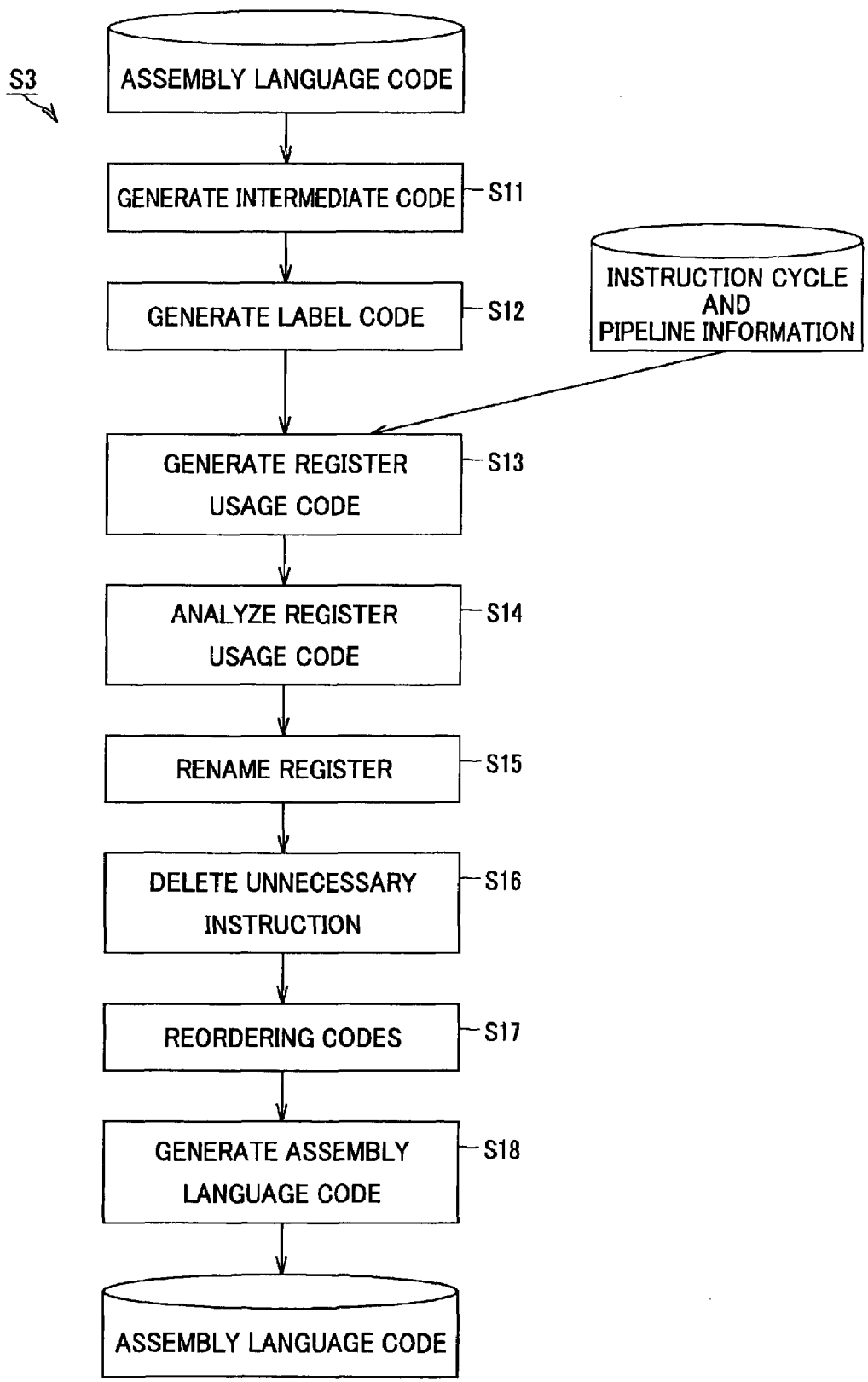
FIG. 10 shows a flow of operations made in the assembly language code optimizer shown in FIG. 9.

FIG. 10 shows a flow of operations made in step S2 by the assembly language code optimizer.

As shown in FIG. 10, the assembly language code optimizer goes through processes including an intermediate code generation (as in step S11), label code generation (as in step S12), register usage code generation (as in step S13), register usage code analysis (as in step S14), register renaming (as in step S15), unnecessary-instruction deletion (as in step S16), code reordering (as in step S17) and assembly language code generation (as in step S18) in this order to optimize the assembly language code. Each of these steps will be described in detail below:

Step S11: Intermediate Code Generation

FIG. 11 shows the data structure of an intermediate code. The intermediate code generation in this step S11 is to generate an intermediate code (shown in FIG. 11) one-to-one corresponding to each line of the assembly language code. As shown in FIG. 11, the intermediate code is composed of a line umber indicating a line order from the top line of the assembly language code, string of characters in the assembly language code, label name (blank when there is no label name) of the assembly language code, content of the instruction in the assembly language code, and an operand in the assembly language code.

Figure 12:
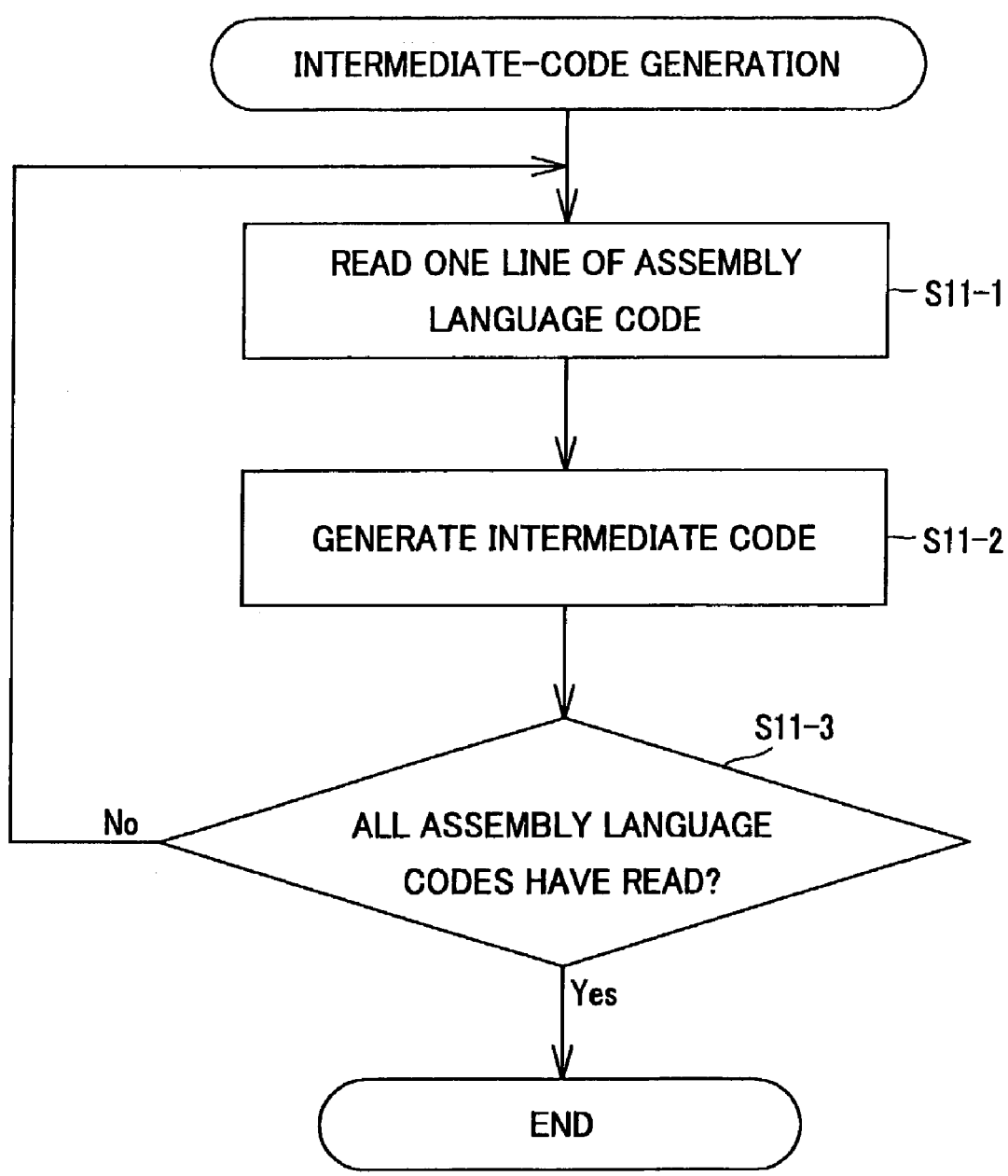
FIG. 12 shows a flow of operations made in generation of the intermediate code.

FIG. 12 shows a flow of operations made in generation of the intermediate code.

The generation of the intermediate code will begin with step S11-1 as in FIG. 12.

In step S11-1, the assembly language code optimizer reads one line of the assembly language code from the beginning from a file having stored therein the assembly language code generated by the compiler. Next in step S11-2, the assembly language code optimizer generates an intermediate code corresponding to the read assembly language code. Then in step S11-3, the assembly language code optimizer judges whether all the assembly language codes in the first to last lines have been read. When the assembly language code optimizer determines that all the assembly language codes have not yet been read, it goes from step S11-3 back to step S11-1 where it will read one line of the assembly language code in a next line. On the contrary, if it determines in step S11-3 that all the assembly language codes have been read, it exits the intermediate code generation process.

Figure 13:
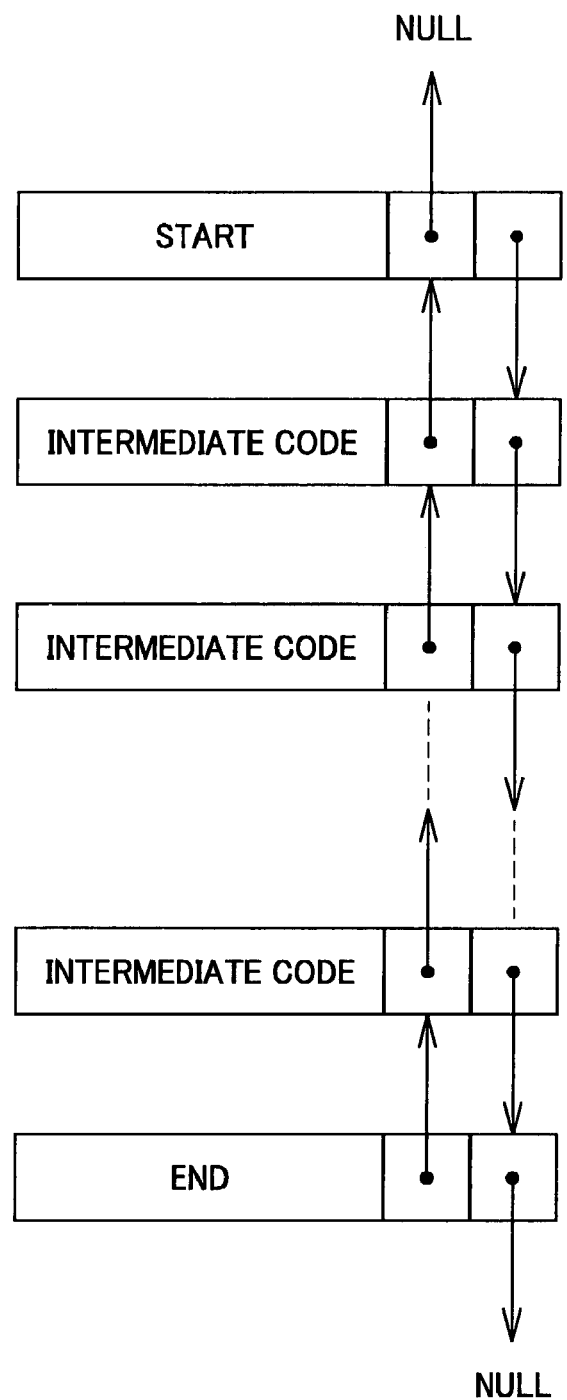
FIG. 13 explains the intermediate codes held in the form of a bidirectional linear list.

Note that the intermediate code is held in the memory in the assembly language code optimizer. Each of the intermediate codes held in the memory includes an index indicating a preceding line (top line includes a start code) and an index indicating a next line (bottom line includes an end code), as shown in FIG. 13. Therefore, the intermediate code group stored in the memory is held as a bidirectional linear list which can be searched code by code forward and backward from an arbitrary line.

Step S12: Label Code Generation

In the label code generation in step S12, a label code one-to-one corresponding to a label statement in the assembly language code as shown in FIG. 14 is generated on the basis of the intermediate code generated in step S11. That is, the label code group generated in this label code generation process will be a code group one-to-one corresponding to the label statement of the assembly language code. As shown in FIG. 14, the label code is composed of a label name of a corresponding label statement, a line number indicating the order of the corresponding label statement from the beginning of the assembly language code, and a line number of a branch instruction which designates the corresponding label statement as a jump destination.

Figure 15:
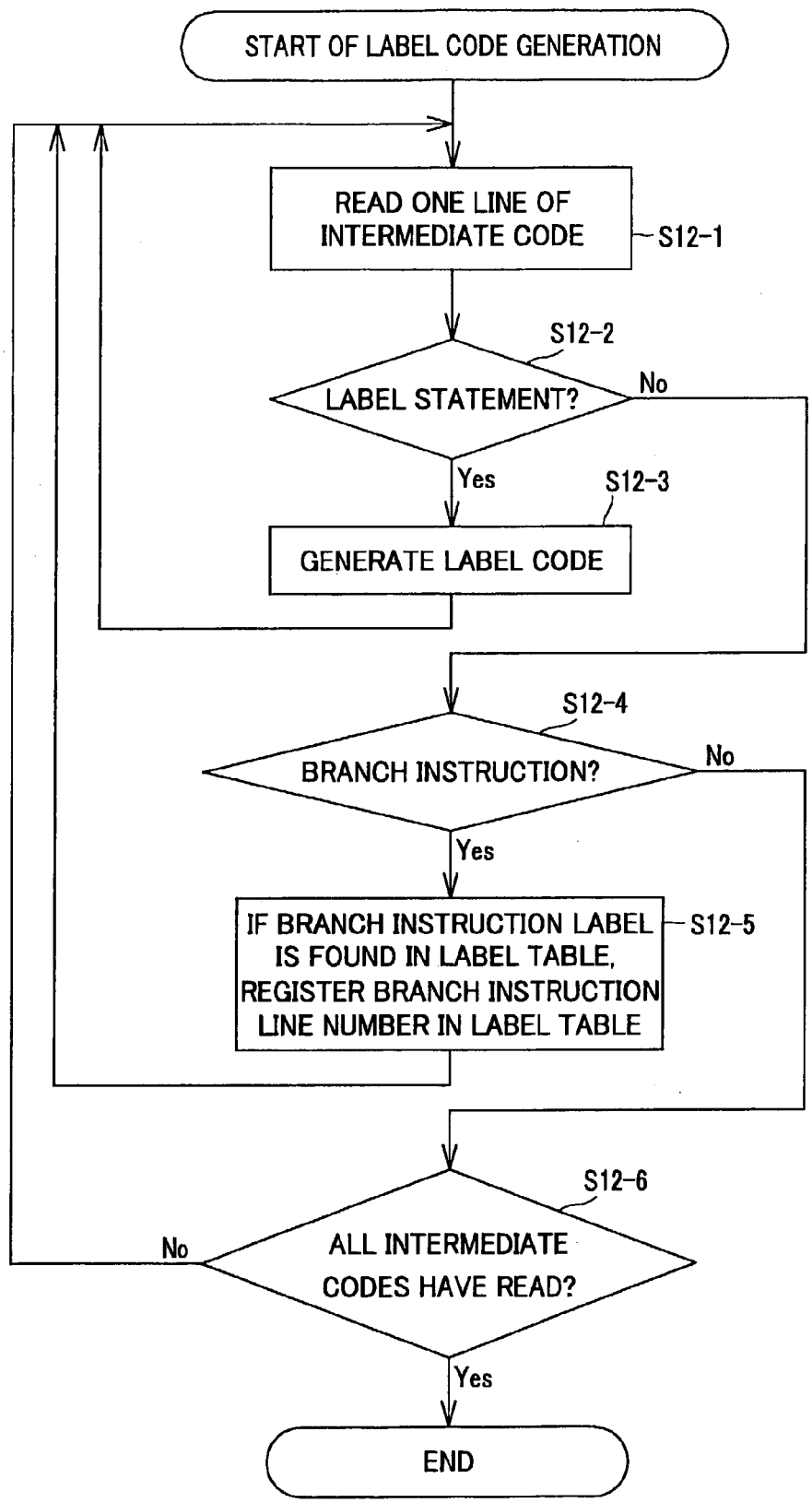
FIG. 15 shows a flow of operations made in generation of the label code.

FIG. 15 shows a flow of operations made in generation of the label code.

The label code generation process begins with step S12-1 as in FIG. 15.

In step S12-1, the assembly language code optimizer reads one line of the intermediate code from the top line. Next in step S12-2, the assembly language code optimizer judges whether the assembly language code corresponding to the read intermediate code is a label statement or not. When the assembly language code optimizer determines that the assembly language code is a label statement, it goes to step S12-3. On the contrary, if the assembly language code optimizer does not determine so, it goes to step S12-4.

In step S12-3, the assembly language code optimizer generates one line of label code on the basis of the read intermediate code. After completion of step S12-3, the assembly language code optimizer will go back to step S12-1 where it will read one line of the intermediate code in a next line and repeat the above operation.

In step S12-4, the assembly language code optimizer judges whether the assembly language code corresponding to the read intermediate code is a branch instruction or not. When the assembly language code optimizer determines that the assembly language code is a branch instruction, it goes to step S12-5. On the contrary, if the assembly language code optimizer does not determine so, it goes to step S12-6.

In step S12-5, the assembly language code optimizer will extract the label name of a branch or jump destination from the character string in the read intermediate code, and searches the label codes having so far been generated for the extracted label name. If the extracted label name is found in such label codes, the assembly language code optimizer will register the line number of the branch instruction in the label code thus found.

Note that if there is no label name found in the label codes having so far been generated, it means that a range from a line stating the label name to a line stating the branch instruction is a repetitive statement. If no label name is found, the assembly language code optimizer will pass through step S12-5 and go back to step S12-1 where it will read one line of the intermediate code in a next line and repeat the aforementioned operations.

In step S12-6, the assembly language code optimizer judges whether all the intermediate codes in the first to last lines have been read. If not, the assembly language code optimizer goes back to step S12-1 where it will read one line of the assembly language code in a next line and repeat the aforementioned operations. When all the intermediate codes in the first to last lines have been read, the assembly language code optimizer exits the label code generation process.

Note that the label code is held in the memory in the assembly language code optimizer. Similarly to the intermediate code, each label code held in the memory is composed of a preceding line (top line includes a start code) and an index indicating a next line (bottom line includes an end code). Therefore, the label code group stored in the memory is held as a bidirectional linear list which can be searched code by code forward and backward from an arbitrary line.

Step S13: Register Usage Code Generation

In the register usage code generation process in step S13, the assembly language code optimizer generates a register usage code, shown in FIG. 16, one-to-one corresponding to each line of the assembly language code on the basis of the intermediate code. As shown in FIG. 16, the register usage code is composed of a label name of a corresponding assembly language code, a line number from the top line of the corresponding assembly language code, a repetitive statement flag indicating whether the corresponding assembly language code is a label statement as the origin of the repetitive statement or not, a floating-point flag indicating whether the content of an instruction in the corresponding assembly language code is a floating-point instruction or not, a number of execute cycles of the instruction in the corresponding assembly language code, and register state information indicating the use of the floating-point register during execution of the corresponding assembly language code.

The register state information is provided for each of the floating-point registers. Namely, the register state information is provided for each of the registers in one register usage code. Use of the register during execution of the assembly language code is entered in the register state information. More specifically, the following four states are entered.

1. State (DST) when a value is assigned to the floating-point register
2. State (REF) when a value in the floating-point register is referred to
3. State (D-R) when a value in the floating-point register is referred to and a value is assigned to the floating-point register in the same cycle
4. State (USE) other than the DST, REF and D-R states, in which a valid value is stored in the floating-point register
5. State (EMPTY) other than the DST, REF, D-R and USE states, in which no valid value is stored in the floating-point register FIG. 17 shows a flow of operations made in generation of the floating-point register usage code.

Figure 17:
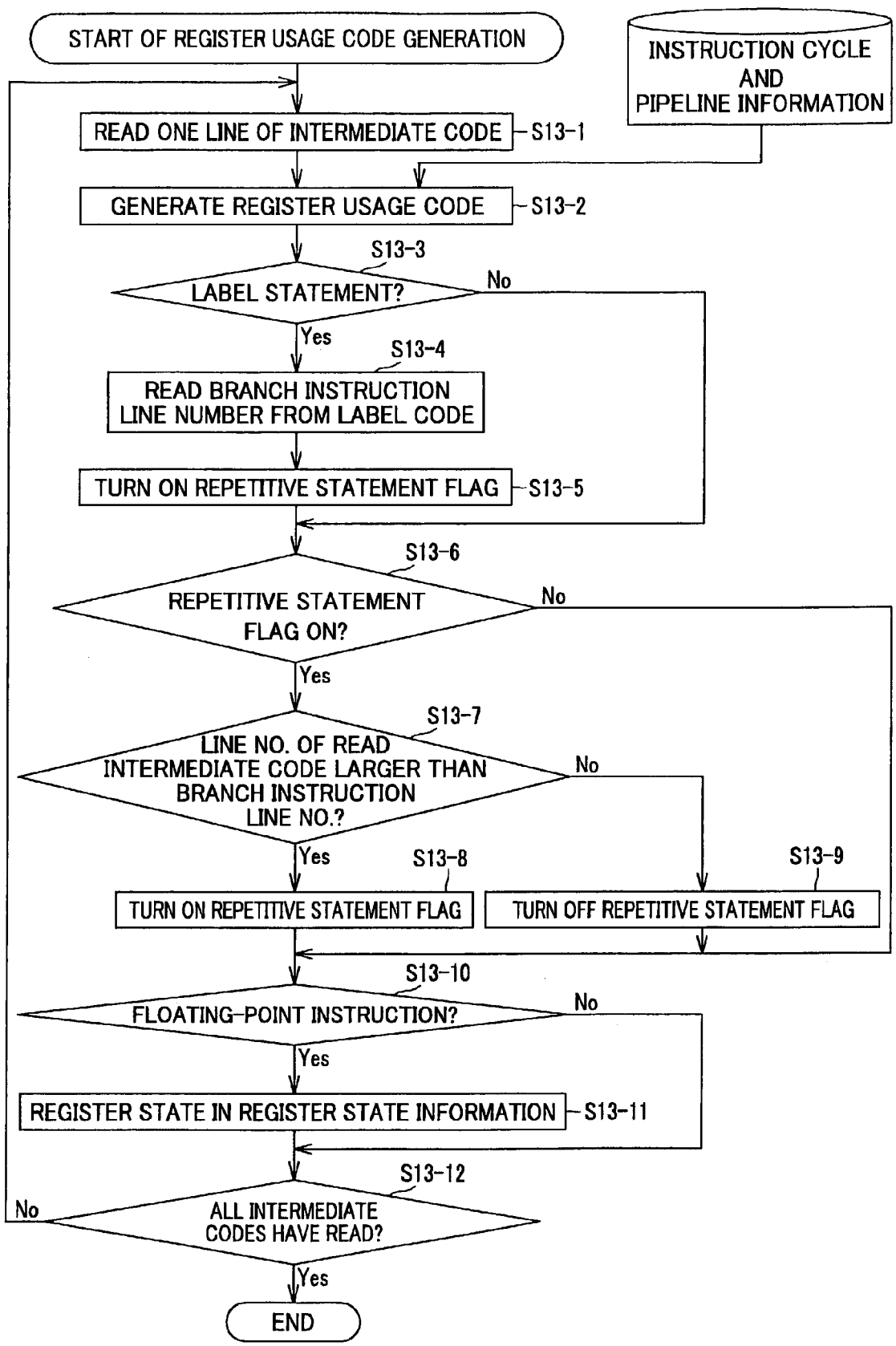
FIG. 17 shows a flow of operations made in generation of the floating-point register usage code.

The register usage code generation process begins with step S13-1 as in FIG. 17.

In step S13-1, the assembly language code optimizer reads one line of the intermediate code. Next in step S13-2, the assembly language code optimizer generates one line of a register usage code corresponding to the read intermediate code. At this time, the assembly language code optimizer determines the content of the instruction in the generated one. When the instruction is a floating-point instruction, the assembly language code optimizer turns on the floating-point flag. On the contrary, if the instruction is not any floating-point instruction, the assembly language code optimizer will turn off the floating-point flag. Also, referring to external instruction cycle and pipeline information, the assembly language code optimizer registers also a number of execute cycles for the instruction in the line. Also, the assembly language code optimizer turns off the repetitive statement flag.

Next in step S13-3, the assembly language code optimizer judges whether the assembly language code corresponding to the read intermediate code is a label statement or not. When it determines that the assembly language code is a label statement, it goes step S13-4. On the contrary, it does not determine so, it goes to step S13-6.

In step S13-4, the assembly language code optimizer reads a label code corresponding to a line number registered in the read intermediate code, and stores a branch instruction line number registered in the label code. Next in step S13-5, the assembly language code optimizer turns on the repetitive statement flag of the register usage code. After completion of step S13-5, the assembly language code optimizer goes on to step S13-6.

In step S13-6, the assembly language code optimizer judges whether the repetitive statement flag of the register usage code is turned on or not. When the repetitive statement flag is on, the assembly language code optimizer goes to step S13-7. On the contrary, if the repetitive statement flag is off, the assembly language code optimizer goes to step S13-10.

In step S13-7, the assembly language code optimizer compares the line number of the read intermediate code with the branch instruction line number stored in step S13-4 to judge whether the line number of the read intermediate code is larger than the branch instruction line number or not. Namely, it judges whether the corresponding assembly language code is a label statement as the origin of the repetitive statement. When the line number of the read intermediate code is larger than the branch instruction line n umber, the assembly language code optimizer hoes to step S13-8. If the line number is smaller than the branch instruction line number, the assembly language code optimizer goes to step S13-9. In step S13-8, the assembly language code optimizer turns on the repetitive statement flag. In step S13-9, it turns off the repetitive statement flag. After completion of steps S13-8 and S13-9, the assembly language code optimizer goes to step S13-10.

In step S13-10, the assembly language code optimizer judges whether the floating-point flag of the register usage code is on. Namely, it judges whether the corresponding assembly language code is a floating-point instruction. When the floating-point flag is on, the assembly language code optimizer goes to step S13-11. On the contrary, the floating-point flag is off, the assembly language code optimizer goes to step S13-12.

In step S13-11, referring to the content of the instruction in the corresponding assembly language code, the assembly language code optimizer detects a register address to which reference is made under the executive instruction and an address to which the result of an operation made under the executive instruction to detects in which state each floating-point register is, DST, REF, D-F or any other state. It should be noted that the floating-point registers in other states than DST, REF and D-F are registered as EMPTY-state floating-point registers. After completion of step S13-11, the assembly language code optimizer goes to step S13-12.

In step S13-12, the assembly language code optimizer judges whether all the intermediate codes in the first to last lines have been read. If the result of judgment is negative, the assembly language code optimizer returns to step S13-1 where it will read one line of the intermediate code in a next line and repeat the aforementioned operations. When all the intermediate codes have been read, the assembly language code optimizer will exit the register usage code generation process.

Note that the register usage code is held in the memory in the assembly language code optimizer. Similarly to the intermediate code, each of the register usage codes is composed of an index indicating a preceding line (top line includes a start code) and an index indicating a next line (bottom line includes an end code). Therefore, the register usage code group stored in the memory is held as a bidirectional linear list which can be searched code by code forward and backward from an arbitrary line.

The register usage code generated as above is as shown in FIGS. 18 to 20. FIG. 18 shows register addresses $f0 to $f10, FIG. 19 shows register addresses $f11 to $f21, and FIG. 20 shows register addresses $f22 to $f31. It should be noted that in FIGS. 18 to 20, the blank portion of the register state information indicates an EMPTY state.

Step S14: Register Usage Code Analysis

In the register usage code analysis process in step S14, the assembly language code optimizer finds a floating-point register in the USE state, and registers the USE state in the register state information. In the aforementioned register usage code generation process in step S13, no USE state has yet been registered in the register state information. In this step S14, the assembly language code optimizer finds a register in the USE state and brings the content of register state information in the register usage code to completion.

Note that the USE state means a state of a register where valid data is stored. Namely, the floating-point register once in the DST state stays in the USE state until it gets into the REF state. Also, between the REF states, the floating-point register is in the USE state. Therefore, the assembly language code optimizer finds a floating-point register in the REF state and registers the floating-point register in the USE state and searches the state of the register forward until reaching an instruction for the register to be in the DST or REF state. It should be noted that other than DST, REF, D-R and USE are EMPTY states where no valid data is stored in the floating-point register. Therefore, the remaining register states remained after the USE state is registered are all taken as EMPTY states.

Figure 21:
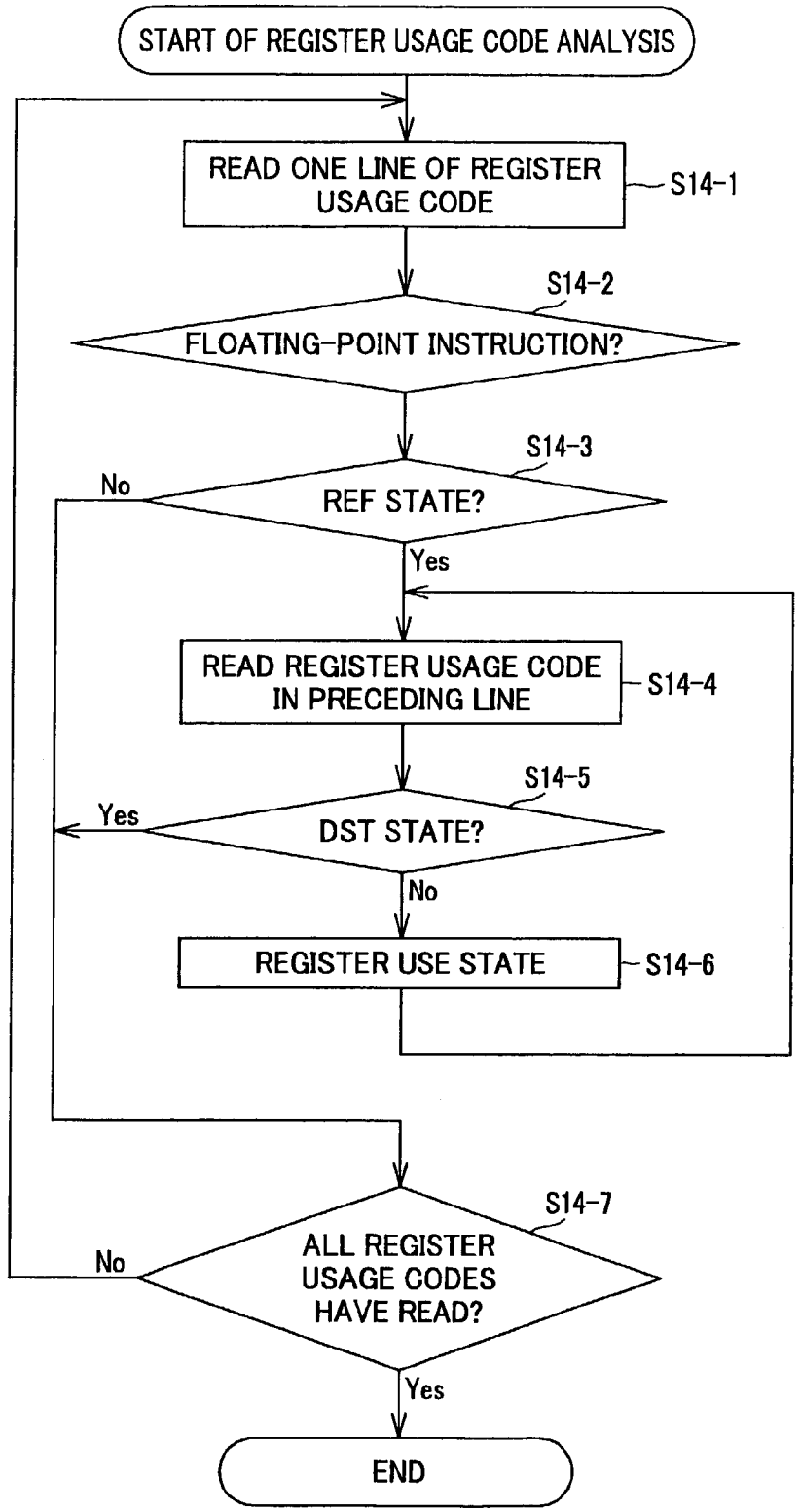
FIG. 21 shows a flow of operations made in analysis of the floating-point register usage code.

FIG. 21 shows a flow of operations made in the floating-point register usage code analysis process.

The register usage code analysis process begins with step S14-1 shown in FIG. 21.

In step S14-1, the assembly language code optimizer reads one line of the register usage code from the top line. Next in step S14-2, the assembly language code optimizer judges whether the floating-point flag of the read floating-point usage code is on or not. When the flag is on, the assembly language code optimizer goes to step S14-3. If the flag is off, the assembly language code optimizer goes to step S14-8.

In steps S14-3, the assembly language code optimizer refers to the register state information in the read floating-point usage code to detect a register in the REF or D-R state. It stores the address of the register as a reference register. When there is detected a REF- or D-R-state register, the assembly language code optimizer goes to step S14-4. If no REF- or D-R-state register is found, the assembly language code optimizer goes to step S14-7.

In step S14-4, the assembly language code optimizer refers to an index appended to the read floating-point usage code to read the register usage code in a preceding line. Next in step S14-5, the assembly language code optimizer refers to the reference-register state information in the read register usage code read in step S14-4 to judge in which state the register is, DST, REF or D-R. If the register is not in any of the DST, REF and D-R states, the assembly language code optimizer goes to step S14-6. On the contrary, when the register is in any of the DST, REF and D-R states, the assembly language code optimizer goes to step S14-7. In step S14-6, the assembly language code optimizer registers the USE state in the reference-register state information. After completion of step S14-6, the assembly language code optimizer returns to step S14-4 where it will repeat the aforementioned operations. It should be noted that the processes in steps S14-4 to S14-6 are applied to all the REF-state reference registers found in step S14-3.

In step S14-7, the assembly language code optimizer resets the read register usage code in the line read in step S14-1 to judge whether all the register usage codes in the first to last lines have been read. If all the codes have not yet been read, the assembly language code optimizer returns to step S14-1 where it will read one line of the register usage code in a next line and repeat the aforementioned operations. When all the codes have been read, the assembly language code optimizer will exit the register usage code analysis process.

With the aforementioned operations, the register usage codes shown in FIGS. 18 to 20 will become as shown in FIGS. 22 to 24. FIG. 22 shows register addresses $f0 to $f10, FIG. 23 shows register addresses $f11 to $f21, and FIG. 24 shows register addresses $f22 to $f31. It should be noted that in FIGS. 22 to 24, the blank portion of the register state information indicates the EMPTY state while the hatched portion indicates the USE state. In the register usage code analysis process, the assembly language code optimizer searches the register state information line by line backward, and registers, as the USE state, a section of the information between the REF and DST states (or REF or D-R state) when the information is searched backward.

Note that as in the register state information shown in FIGS. 22 to 24, only even-number addresses of the floating-point registers are used with the odd-number addresses being all in the EMPTY state.

Step S15: Register Renaming

In the register renaming process in step S15, the assembly language code optimizer detects floating-point instructions interlocked in the assembly language code and moves a register commonly used in the interlocked floating-point instructions to another register.

Note that the "interlocked" state means a state in which while a floating-point instruction, taken as a first instruction, is being performed, another floating-point instruction referring to an assignment value of the first former floating-point instruction and taken as a second instruction is kept from being pipelined to prevent the second instruction from being performed before the first instruction is completely performed. That is, when an interval between a floating-point instruction "A" and a floating-point instruction "B"-referring to the instruction "A" is smaller than an execute cycle "X" of the instruction "A", the instructions "A" and "B" are interlocked with each other.

Figure 25:
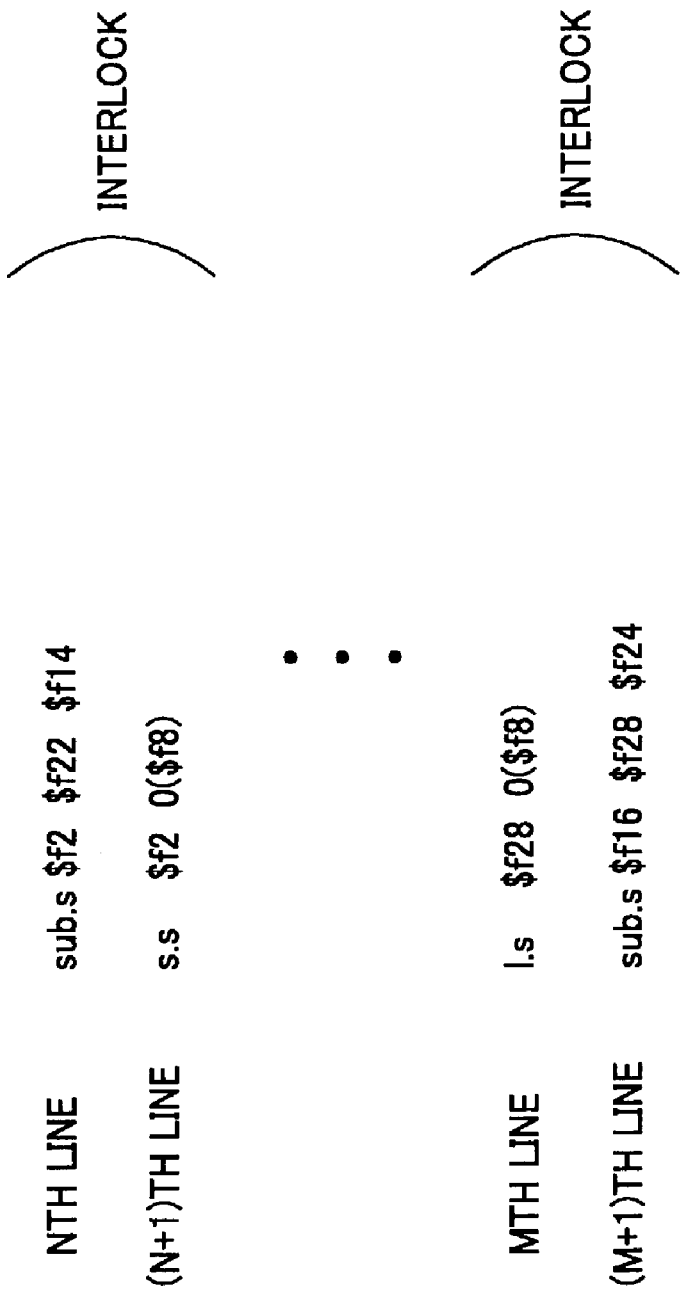
FIG. 25 an example of the assembly language code when an interlock is taking place.

More specifically, in an assembly language code in which an interlocking has taken place as shown in FIG. 25, a single-precision subtract instruction sub.s is performed in an Nth line, and an store instruction s.s is issued to a single-precision memory in an (N+1)th line. Under the subtract information sub.s in the Nth line, a result of operation is assigned to a register at an address is $f2, and under the store instruction s.s in the (N+1)th line, data is stored from the register at the address $f2 into the memory. On the assumption that the number of execute cycles of each of these instruction is 2, the subtract instruction s.s in the (N+1)th line cannot be performed until the subtract instructions sub.s in the Nth line are all completely pipelined, and "interlocking" takes place.

Similarly, in the assembly language code shown in FIG. 25, a load instruction l.s from the single-precision memory is done in an Mth line, and a subtract instruction sub.s is performed in an (M+1)th line. Under the load instruction l.s from the memory in the Mth line, data is assigned to a register at an address $f28 and under the subtract instruction sub.s in the (M+1)th line, subtraction is performed referring to the register at the address $f28. Thus, the subtract instruction sub.s in the (M+1)th line cannot be performed until the load instructions l.s in the Mth line are all completely pipelined, and "interlocking" takes place.

In the register renaming process in step S15, the assembly language code optimizer moves a register address used commonly in these instructions interlocked as above to a register not allocated by the compiler, namely, to an odd-number register.

Figure 26:
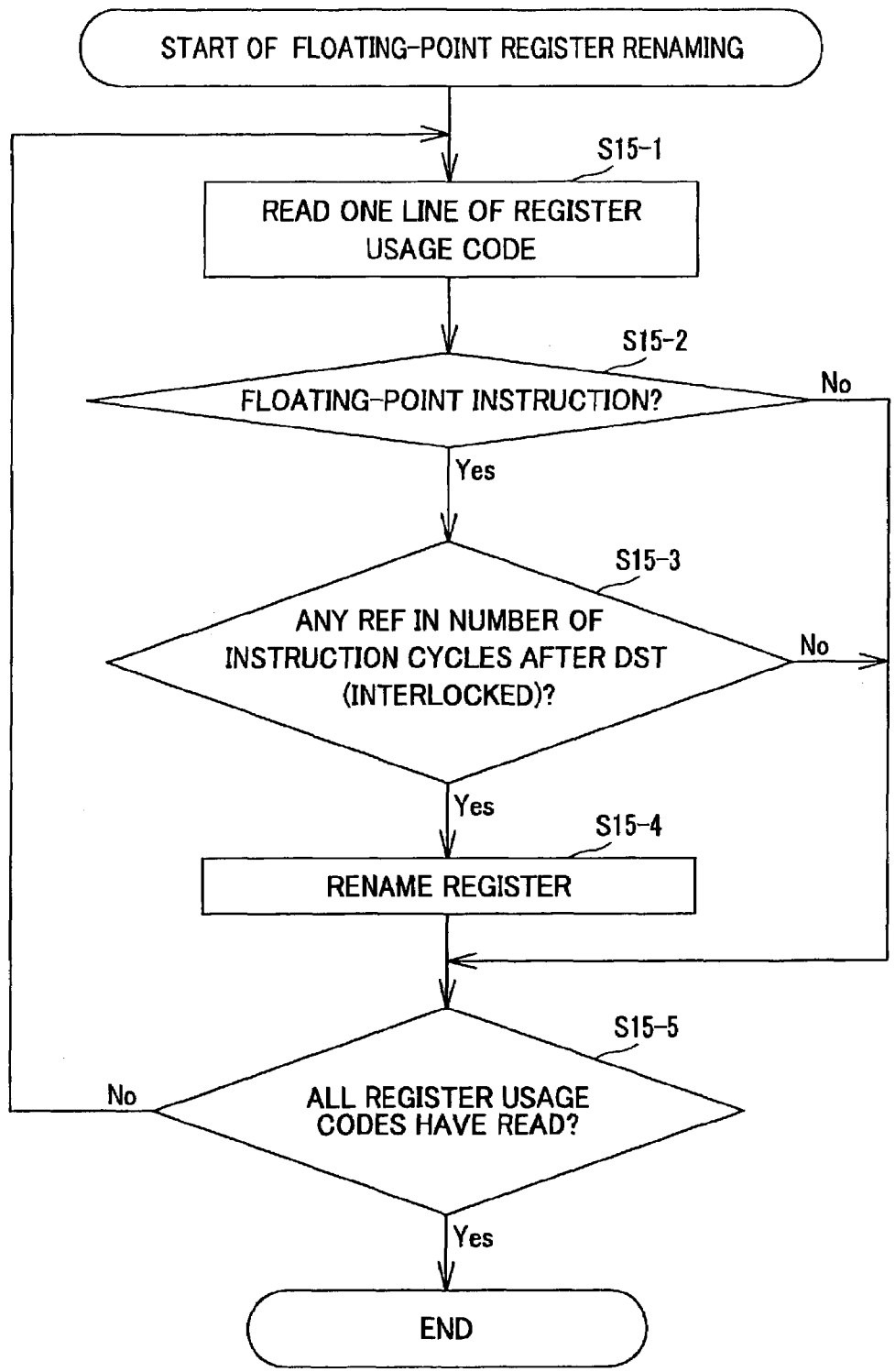
FIG. 26 shows a flow of operations made in renaming the floating-point register.

FIG. 26 shows a flow of operations made in the register renaming process.

The register remaining process begins with step S15-1 as shown in FIG. 26.

In step S15-1, the assembly language code optimizer reads one line of the register usage code from the top line. Next in step S15-2, the assembly language code optimizer judges whether the floating-point flag of the read floating-point usage code is on or not. When the flag is on, the assembly language code optimizer goes to step S15-3. If the flag is off, the assembly language code optimizer goes to step S15-5.

In step S15-3, the assembly language code optimizer detects a register in the DST state referring to the register state information to detect a number of execute cycles counted until the register takes the REF state again. That is to say, the assembly language code optimizer detects a number of instruction cycles counted until a value assigned under the instruction is referred to by another instruction. Then, the assembly language code optimizer makes a comparison between the number of instruction cycles counted until the value assigned under the instruction is referred to by the other instruction and that of instruction cycles with which the instruction is performed. When the result of comparison shows that the number of instruction cycles with which the instruction is performed is larger than that of the instruction cycles until the value assigned under the instruction is referred to by the other instruction, namely, in case the instruction and other instruction are interlocked with each other, the assembly language code optimizer goes to step S15-4. If no interlocking takes place between the instructions, the assembly language code optimizer goes to step S15-5.

In step S15-4, the assembly language code optimizer moves the register address used commonly in the interlocked instructions to a register address not allocated by the compiler, that is, to an odd-number register address. After completion of step S15-4, the assembly language code optimizer goes to step S15-5.

In step S15-5, the assembly language code optimizer judges whether all the register usage codes in the first to last lines have been read. If the codes have not yet been read, the assembly language code optimizer returns to step S15-1 where it will read one line of the register usage code in a next line and repeat the aforementioned operations. If all the codes have been read, the assembly language code optimizer will exit the register renaming process.

With the above-mentioned register renaming operations, the register address used commonly in the interlocked registers will be moved to an odd-number address having not so far been used. By applying the register renaming process to an assembly language code shown in FIG. 25, for example, the register-addresses in the Nth and (N+1)th lines are moved from the address $f2 to $f1 while the register addresses in the Mth and (M+1)th lines are moved from $f28 to $f3.

Step S16: Unnecessary-instruction Deletion

In the unnecessary-instruction deletion process in step S16, the assembly language code optimizer detects an unnecessary store instruction and load instruction having taken place in the register naming process, and deletes such instructions.

Figure 28:
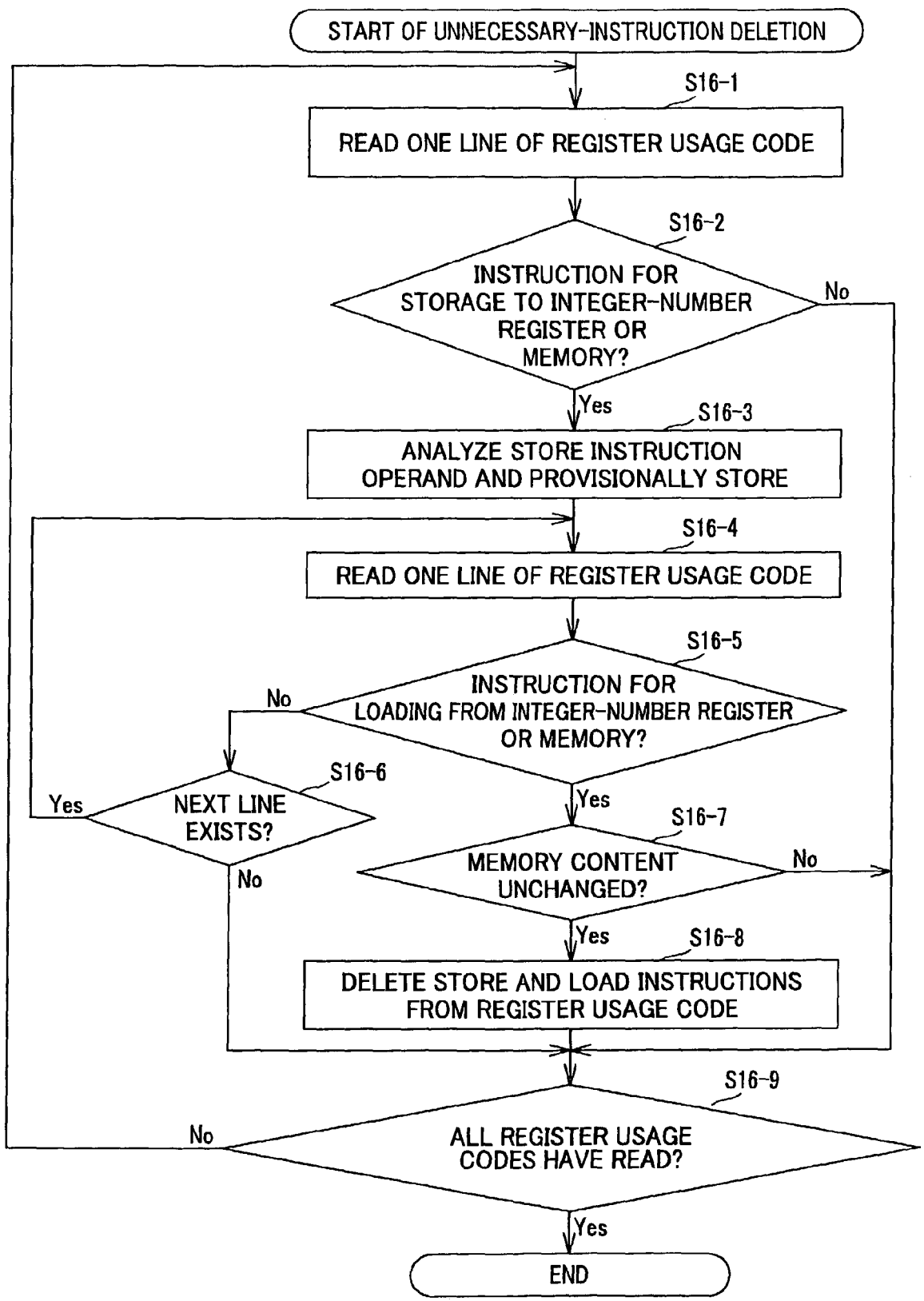
FIG. 28 shows a flow of operations made in deletion of an unnecessary instruction.

FIG. 28 shows a flow of operations made in deletion of an unnecessary instruction.

The unnecessary-instruction deletion process begins with step S16-1 as shown in FIG. 28.

In step S16-1, the assembly language code optimizer reads one line of the register usage code from the top line. Next in step S16-2, the assembly language code optimizer analyses the instruction in the read floating-point usage code and judges whether the instruction is an instruction for storage to an integer-number register (fixed-point register) or memory or not. When the instruction is the store instruction, the assembly language code optimizer goes to step S16-3. On the contrary, if the instruction is not any store instruction, the assembly language code optimizer goes to step S16-10.

In step S16-3, the assembly language code optimizer stores the address of the fixed-point register as a storage destination and that of a memory. Next in step S16-4, the assembly language code optimizer reads the register usage code in a next line referring to an index appended to the read floating-point usage code. Then in step S16-5, the assembly language code optimizer judges whether the instruction is to load data from the storage-destination address or not. When the instruction is a load instruction, the assembly language code optimizer goes to step S16-7. On the contrary, if the instruction is not any load instruction, the assembly language code optimizer goes to step S16-6. In step S16-6, the assembly language code optimizer judges, referring to the index, whether a register usage code exists in a next line or not. When the register usage code exists, the assembly language code optimizer returns to step S16-4 where it will repeat the aforementioned operations. If no register usage code exists, the assembly language code optimizer goes to step S16-9.

In step S16-7, the assembly language code optimizer judges whether for a period from the store instruction to the load instruction, the content of the stored data has changed or not. When the data content has not changed, the assembly language code optimizer goes to step S16-8. If the data content has changed, the assembly language code optimizer goes to step S16-9.

In step S16-8, the assembly language code optimizer deletes the detected store and load instructions from the register usage code, and detects an instruction to which data to be stored is assigned and an instruction referring to the loaded data and move the register address commonly used in such instructions to a register address not allocated by the compiler, that is, to a n odd-number register address.

In step S16-9, the assembly language code optimizer resets the read register usage code in the line read in step S16-1 and judges whether all the register usage codes in the first to last lines have been read. If all the codes have not yet been read, the assembly language code optimizer returns to step. S16-1 where it will read one line of the register usage code in a next line and repeat the aforementioned operations. On the contrary, when all the codes have been read, the assembly language code optimizer will exit this unnecessary-instruction deletion process.

Figure 29:
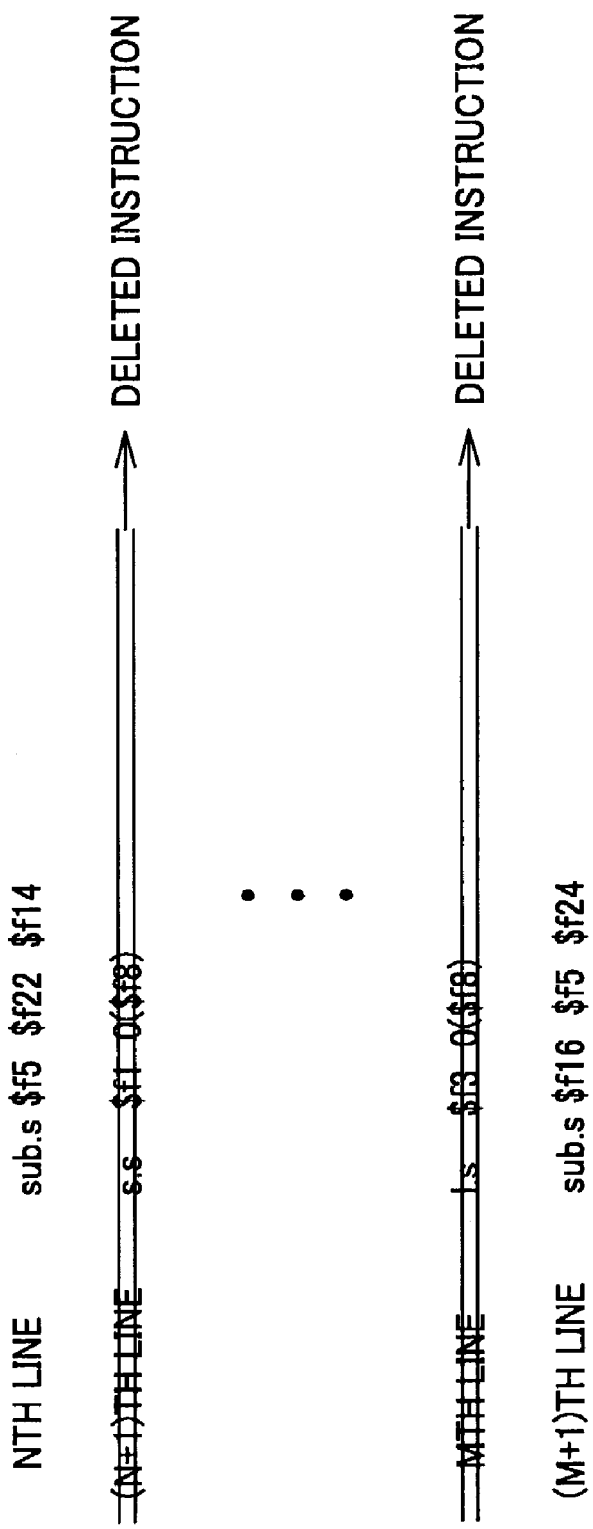
FIG. 29 shows the assembly language code after the unnecessary instruction deletion is made for the assembly language code shown in FIG. 27.

With the aforementioned operations for the unnecessary-instruction deletion, the memory store instruction and memory load instruction will be deleted and the register address commonly used in the pre-store instruction and post-load address will be moved to an odd-number address having not so far been used. For example, by applying the unnecessary-instruction deletion process to the assembly language code shown in FIG. 27, the store instruction in the (N+1) line and load instruction in the Mth line are deleted as shown in FIG. 29.

Step S17: Code Reordering

In the code reordering process in step S17, the assembly language code optimizer detects instructions interlocked with each other and moves other instructions to between the interlocked instructions.

The instruction to be moved is a one after the interlocked instructions. Also, the instruction to be moved should be a one having no register-dependency relation with all instructions included between the interlocked instructions and the instruction to be moved. The instruction having no such register-dependency is a one which will not influence any other instructions. Also, the instruction movement should be not to be over the label statement and branch statement.

Figure 30:
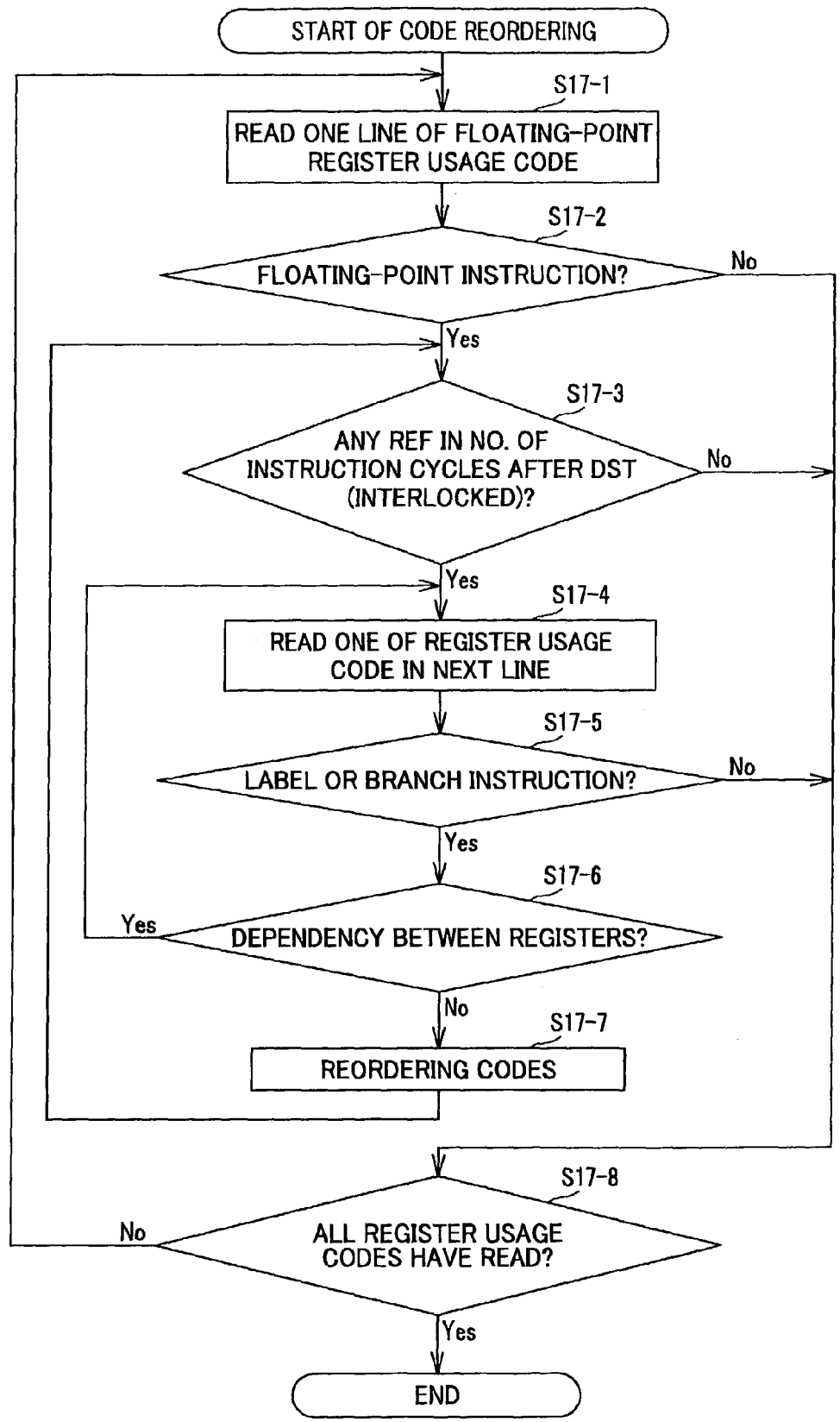
FIG. 30 shows a flow of operations made in code reordering.

FIG. 30 shows a flow of operations made in code reordering.

The code reordering process begins with step S17-1 as shown in FIG. 30.

In step S17-1, the assembly language code optimizer reads one line of the register usage code. Next in step S17-2, the assembly language code optimizer judges whether te floating-point flat of the read floating-point usage code is on or not. When the flag is on, the assembly language code optimizer goes to step S17-3. On the contrary, if the flag is off, the assembly language code optimizer goes to step S17-8.

In step S17-3, the assembly language code optimizer detects, referring to the register state information, a register in the DST state and thus detects a number of instruction cycles counted until the register gets into the REF state again. That is, the assembly language code optimizer detects a number of instruction cycles counter until a value assigned under the instruction is referred to by another instruction. Then, the assembly language code optimizer makes a comparison between the number of instruction cycles counted until the value assigned under the instruction is referred to by another instruction, and the number of instruction cycles with which the instruction is performed. When the result of comparison shows that the number of instruction cycles counted until the value assigned under the instruction is referred to by another instruction is larger than the number of instructions with which the instruction is performed, that is, when the instruction is interlocked with another instruction, the assembly language code optimizer goes to step S17-4. When no interlocking takes place, the assembly language code optimizer goes to step S17-8.

In step S17-4, the assembly language code optimizer reads the register usage code in a next line referring to an index appended to the read floating-point usage code. Next in step S17-5, the assembly language code optimizer judges whether the read register usage code is a label statement or branch instruction or not. When the code is a label statement or branch instruction, the assembly language code optimizer goes to step S17-6. If the code is not any label statement or branch instruction, the assembly language code optimizer goes to step S17-8. In step S17-6, the assembly language code optimizer judges whether the instruction stated in the read register usage code has the register-dependency relation with all the instructions included between the interlocked instructions and this instruction. When there is no such relation found, the assembly language code optimizer goes to step S17-7. If there is found such a relation, the assembly language code optimizer will repeat the above operations starting with step S17-4.

In step S17-7, the assembly language code optimizer replaces the line number of the read floating-point usage code with a line number between the interlocked instructions detected in step S17-3, thereby reordering the floating-point usage code. Next, the assembly language code optimizer resets the read floating-point usage code in the line number as in step S17-1, and returns to step S17-3 where it will repeat the operations.

In step S17-8, the assembly language code optimizer judges whether all the register usage codes in the first to last lines have been read. If all the codes have no yet been read, the assembly language code optimizer returns to step S17-1 where it will read one line of the register usage code in a next line and repeat the aforementioned operations. When all the codes have been read, the assembly language code optimizer will exit this core reordering process.

With the operations made in the aforementioned code reordering process, an instruction having no register-dependency relation is inserted between the interlocked instructions and thus the interlocking can be avoided. For example, even in case an interlocking has taken place (between the (N+1)th and (N+2)th lines; (N+4)th and (N+5)th lines) as shown in FIG. 31(A), the code reordering permits to insert an instruction having no register-dependency relation between the interlocked instructions as shown in FIG. 31(B), to thereby avoiding interlocking.

Step S18: Assembly Language Code Generation

In the assembly language code generation process in step S18, the assembly language code optimizer generates an assembly language code instruction character string from the register usage code, and an assembly language code from the register state information.

Figure 32:
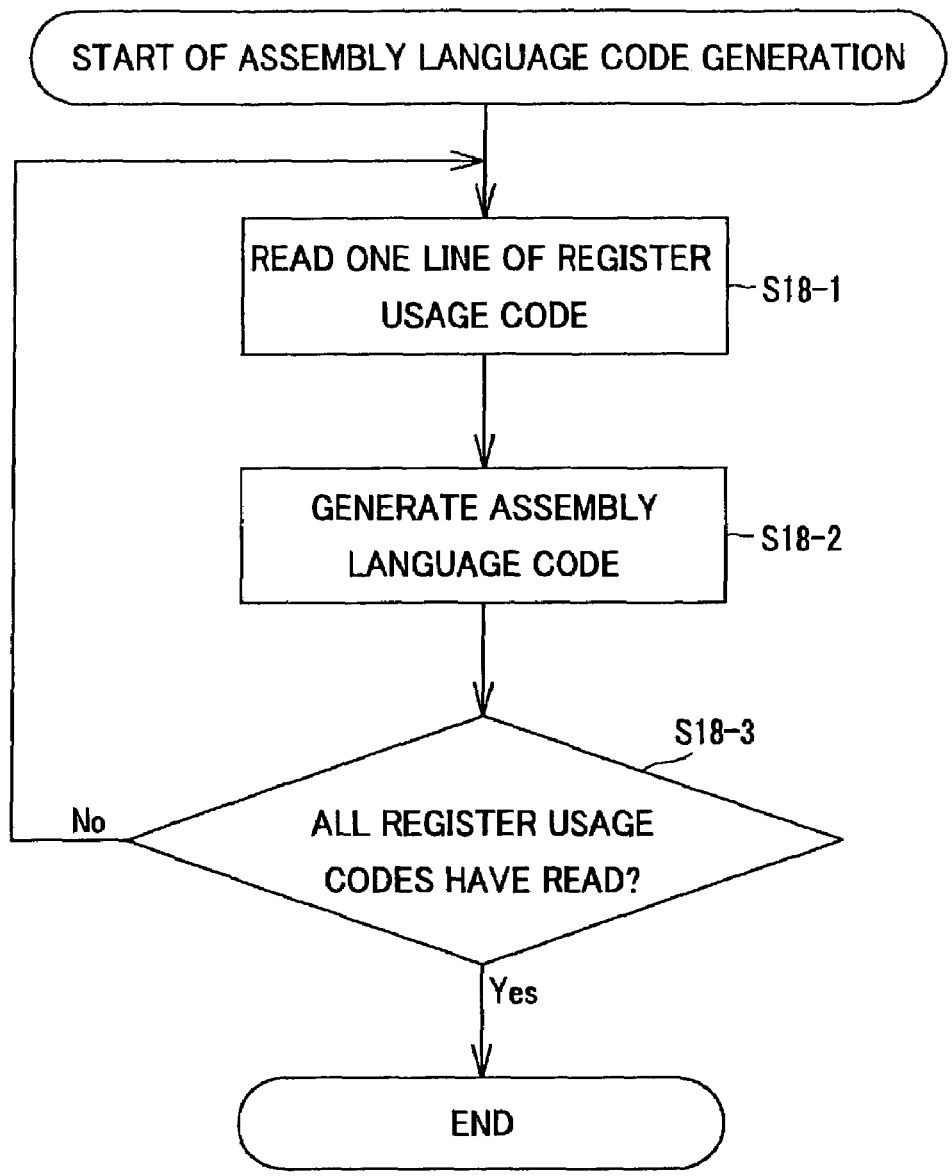
FIG. 32 shows a flow of operations in generation of the assembly language code.

FIG. 32 shows a flow of operations in generation of the assembly language code.

The assembly language code generation begins with step S18-1 as shown in FIG. 32.

In step S18-1, the assembly language code optimizer reads one line of the register usage code from the top line. Next in step S18-2, the assembly language code optimizer generates an assembly language code corresponding to the read register usage code. Then in step S18-3, the assembly language code optimizer judges whether all the register usage codes in the first to last lines have been read. When all the codes have not yet been read, the assembly language code optimizer returns to step S18-1 where it will read one line of the register usage code in a next line and repeat the aforementioned operations. If all the codes have been read, the assembly language code optimizer will exit this assembly language code generation process.

The assembly language code thus generated is stored in a file, for example.

In the aforementioned code conversion according to the present invention, a floating-point register having an address not allocated by the compiler is used to reorder the floating-point instruction code.

Therefore, the code conversion method according to the present invention permits to reduce the number of instructions used and prevent instructions from being interlocked with each other. Thus, the code conversion method according to the present invention allows to perform a program with an improved efficiency.

Note that although the assembly language code optimization is done as a separate operation from compilation from a high-level programming language into an assembly language code in the present invention, it may be done along with the compilation.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The assembly code conversion method and apparatus according to the present invention permit to perform a program with an improved efficiency.

What is claimed is:

1. A code conversion method of converting a program code having an instruction operand stated therein with an assembly language code represented by a register address in a data processing system, the method comprising:

an interlock detecting step of detecting an interlocked instruction among floating-point instructions included in the program code, on which the number of instructions counted until a register having the operand assigned thereto is referred to by another instruction is smaller than the number of execute cycles of the floating-point instruction;

an address renaming step of changing a register address according to which an operand is referred to and assigned by the interlocked instructions to a register address not assigned as an instruction operand when the assembly language code is compiled; and a code reordering step of detecting an instruction which is not in any register-dependency relation with all the instructions between itself and the interlocked instruction among the instructions ranging from the interlocked instruction to a first label statement or branch instruction found after the interlocked instruction, and moving the detected instruction code to any position between the interlocked instructions and an instruction referring to a register in which the operand has been assigned under the interlocked instruction.

2. The code conversion method as set forth in claim 1, wherein the program code is supplied to said data processing system after compiled from its statement in a high-level programming language to an assembly language code suitable for the data processing system.

3. The code conversion method as set forth in claim 1, wherein said instruction includes a single-precision floating-point instruction by which one register is dealt with as a one-word operand and a double-precision floating-point instruction by which two registers are dealt with as one-word operand.

4. A code converter for converting a program code having an instruction operand stated therein with an assembly language code represented by a register address in a data processing system, the apparatus comprising:

an interlock detecting means for detecting an interlocked instruction among floating-point instructions included in the program code, on which the number of instructions counted until a register having the operand assigned thereto is referred to by another instruction is smaller than the number of execute cycles of the floating-point instruction;

an address renaming means for changing a register address according to which an operand is referred to and assigned by the interlocked instructions refer to a register address not assigned as an instruction operand when the assembly language code is compiled; and a code reordering means for detecting an instruction which is not in any register-dependency relation with all the instructions between itself and the interlocked instruction among the instructions ranging from the interlocked instruction to a first label statement or branch instruction found after the interlocked instruction, and moving the detected instruction code to any position between the interlocked instructions and an instruction referring to a register in which the operand has been assigned under the interlocked instruction.

5. The apparatus as set forth in claim 4, wherein the program code is supplied to said data processing system after compiled from its statement in a high-level programming language to an assembly language code suitable for the data processing system.

6. The apparatus as set forth in claim 4, wherein said instruction includes a single-precision floating-point instruction by which one register is dealt with as a one-word operand and a double-precision floating-point instruction by which two registers are dealt with as one-word operand.

* * * * *